United States Patent [19]

Mizutani et al.

[11] Patent Number: 5,799,264
[45] Date of Patent: Aug. 25, 1998

[54] IN-CAR NAVIGATION APPARATUS WITH VOICE GUIDANCE

[75] Inventors: Yoshisada Mizutani; Toshiki Kusama, both of Hyogo, Japan

[73] Assignee: Mitsubishi Denki Kabushiki Kaisha, Tokyo, Japan

[21] Appl. No.: 533,787

[22] Filed: Sep. 26, 1995

[30] Foreign Application Priority Data

Jan. 20, 1995 [JP] Japan ................................. 7-007788

[51] Int. Cl.⁶ .......................... G01C 21/00; G06F 165/00
[52] U.S. Cl. ............................................ 701/211; 340/996
[58] Field of Search .......................... 364/449.5, 449.2, 364/449.3, 449.7; 340/995, 996; 395/2.79, 2.67; 701/211, 208, 209, 213

[56] References Cited

U.S. PATENT DOCUMENTS

| | | | |
|---|---|---|---|
| 5,177,685 | 1/1993 | Davis et al. ........................ | 364/443 |
| 5,406,492 | 4/1995 | Suzuki ................................ | 354/449 |
| 5,410,486 | 4/1995 | Kishi et al. ........................ | 364/449 |
| 5,452,212 | 9/1995 | Yokoyama et al. ................ | 364/449 |
| 5,465,088 | 11/1995 | Braegas ............................. | 340/905 |
| 5,475,599 | 12/1995 | Yokoyama et al. ................ | 364/449 |

FOREIGN PATENT DOCUMENTS 0560987  9/1993  European Pat. Off. .

*Primary Examiner*—Michael Zanelli
*Attorney, Agent, or Firm*—Sughrue, Mion, Zinn, Macpeak & Seas, PLLC

[57] ABSTRACT

An in-car navigation apparatus produces a concept of a voice message such as a guide of an advancing route or a guide of an arrival to be informed at a point on a set drive route where voice information is to be given by means of the control section thereof, and produces a message sentence from a table defining a sentence pattern corresponding to the concept of a voice message and an device storing voice waveform information by means of a detachable voice information memorizing section. Thereby, the changes of the sentence patterns of voice messages and so forth can easily be done without varying the program of the apparatus.

11 Claims, 42 Drawing Sheets

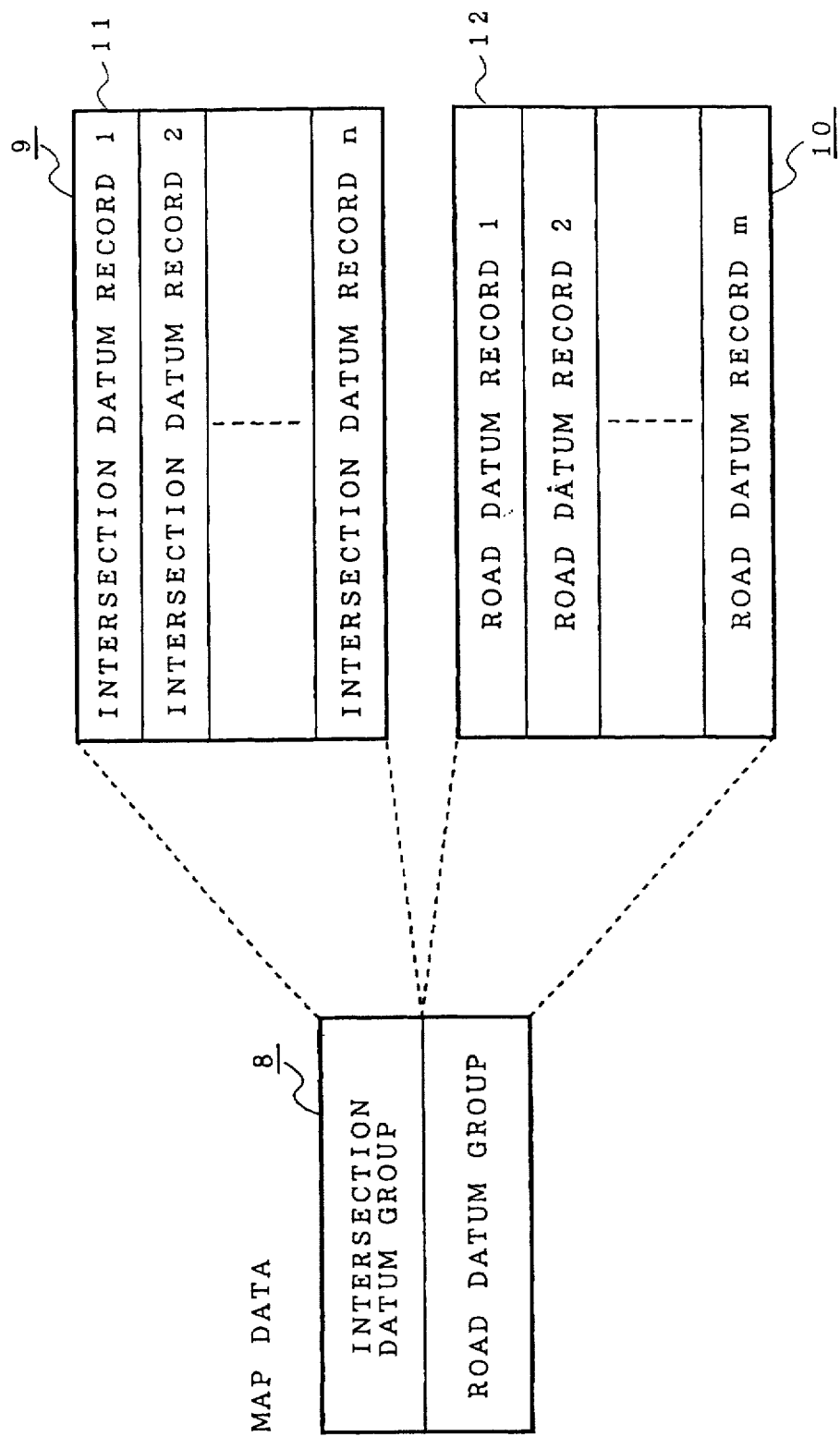

FIG. 3A

INTERSECTION
DATUM RECORD 11

| INTERSECTION NUMBER | ~13 |
| INTERSECTION COORDINATES | ~14 |
| NUMBER OF CONNECTING ROADS (n) | ~15 |
| ROAD NUMBER 1 | ~16 |
| ROAD NUMBER 2 | |
| ---- | |
| ROAD NUMBER n | |

FIG. 3B

ROAD DATUM RECORD 12

| ROAD NUMBER | ~17 |
| INTERSECTION NUMBER ON START POINT SIDE | ~18 |
| INTERSECTION NUMBER ON TERMINAL POINT SIDE | ~19 |
| NUMBER OF INTERPOLATED POINTS (m) | ~20 |
| COORDINATES ON START POINT SIDE | ~22 |
| COORDINATES OF INTERPOLATED POINT 1 | ~21 |
| COORDINATES OF INTERPOLATED POINT 2 | |
| ---- | |
| COORDINATES OF INTERPOLATED POINT m | |
| COORDINATES ON TERMINAL POINT SIDE | ~23 |

FIG. 5A

VOICE WAVEFORM DATA
MANAGING RECORD 25

| WAVEFORM CODE | POINTER | (CONTENTS) |
|---|---|---|
| 100 | 0 | IN NO TIME |
| 200 | 251 | BEYOND THIS |
| 1210 | 398 | ABOUT 1km AHEAD |
| 1211 | 623 | ABOUT 2km AHEAD |
| --- | --- | --- |
| 3002 | 11176 | GO STRAIGHT |
| 3003 | 11814 | TO THE LEFT |
| 3004 | 12523 | TO THE RIGHT |
| 3005 | 13011 | THROUGH POINT |
| 3006 | 13621 | GOAL POINT |
| 4005 | 14112 | AROUND THROUGH POINT |
| 4006 | 15101 | AROUND GOAL POINT |

FIG. 5B

DIGITIZED WAVEFORM DATA 26

| 0 | 1 | 2 | ---- | 251 | 252 | ---- |
|---|---|---|---|---|---|---|
| 25H | 30H | DCH | ---- | 10H | 97H | ---- |

CONCEPT MESSAGE TABLE

FIG. 7

CONCEPT MESSAGE PATTERN TABLE

| CONCEPT OF MESSAGE | CODE TRAIN OF MESSAGE PATTERN |
|---|---|
| INSTRUCTION 1 | 1000+f(DISTANCE)+200, f(DIRECTION)+3000 |
| INSTRUCTION 2 | 100, f(DIRECTION)+3000 |
| ARRIVAL | 100, f(PLACE NAME)+3000 |
| | — — — |

FIG. 10

RETRIEVAL TABLE DATUM RECORD 43 37

| RECORD NUMBER 42 | RETRIEVAL VALUE | WAVEFORM CODE 44 |
|---|---|---|
| 1 | GO STRAIGHT | 2 |
| 2 | TO THE LEFT | 3 |
| 3 | TO THE RIGHT | 4 |
| 4 | THROUGH POINT | 5 |
| 5 | GOAL POINT | 6 |
| --- | --- | --- |
| n | 1 Km | 10 |
| n+1 | 2 Km | 11 |

FIG. 16B

ROAD DATUM RECORD 86

| ROAD NUMBER | INTERSECTION NUMBER ON START POINT SIDE | INTERSECTION NUMBER ON TERMINAL POINT SIDE | NUMBER OF INTERPOLATED POINTS (m) | COORDINATES ON START POINT SIDE | COORDINATES OF INTERPOLATED POINT 1 | COORDINATES OF INTERPOLATED POINT 2 | ----- | COORDINATES OF INTERPOLATED POINT m | COORDINATES ON TERMINAL POINT SIDE |
|---|---|---|---|---|---|---|---|---|---|
| 94 | 95 | 96 | 97 | 98 | 99 | | | | 100 |

FIG. 16A

INTERSECTION DATUM RECORD 85

| INTERSECTION NUMBER | INTERSECTION COORDINATES | NUMBER OF CONNECTING ROADS (n) | ROAD NUMBER 1 | ROAD NUMBER 2 | ----- | ROAD NUMBER n |
|---|---|---|---|---|---|---|
| 90 | 91 | 92 | 93 | | | |

EXAMPLE: "THERE IS A SET POINT ON THE RIGHT SIDE SOON"

- 107
- 108 ○ INTERSECTION
- 109 = } ROAD
- 110 ◎ SET POINT
- 111 ▲ PRESENT POINT

- ○ NODE OF INTERSECTION
- ◎ SET POINT
- △ PRESENT POSITION

FIG. 20

| ANGLE | CLASSIFICATION OF VOICE WAVEFORM | CONTENTS OF VOICE MESSAGE (EXAMPLES) |
|---|---|---|
| $-45° \leq \theta \leq 45°$ | AHEAD | "THERE IS A SET POINT NEAR AHEAD" |
| $45° < \theta \leq 180°$ | RIGHT SIDE | "THERE IS A SET POINT ON THE RIGHT SIDE SOON" |
| $180° < \theta \leq 315°$ | LEFT SIDE | "THERE IS A SET POINT ON THE LEFT SIDE SOON" |

FIG. 24B

ROAD DATUM RECORD 152

| ROAD NUMBER | INTERSECTION NUMBER ON START POINT SIDE | INTERSECTION NUMBER ON TERMINAL POINT SIDE | NUMBER OF INTERPOLATED POINTS (m) | COORDINATES ON START POINT SIDE | COORDINATES OF INTERPOLATED POINT 1 | COORDINATES OF INTERPOLATED POINT 2 | ----- | COORDINATES OF INTERPOLATED POINT m | COORDINATES ON TERMINAL POINT SIDE |
|---|---|---|---|---|---|---|---|---|---|

INTERSECTION DATUM RECORD 151

| INTERSECTION NUMBER | INTERSECTION COORDINATES | NUMBER OF CONNECTING ROADS (n) | ROAD NUMBER 1 | ROAD NUMBER 2 | ----- | ROAD NUMBER n |
|---|---|---|---|---|---|---|

153, 154, 155, 156

EXAMPLE: "GO STRAIGHT AT THE NEXT INTERSECTION BEFORE LONG"

FIG. 26

| RANGE OF DISTANCE 171 | DIRECTION 172 | CLASSIFICATION OF VOICE WAVEFORM 173 | CONTENTS OF VOICE MESSAGE (EXAMPLES) 170 |
|---|---|---|---|
| ℓ < 0.7 km | GO STRAIGHT | GO STRAIGHT 1 | "GO STRAIGHT AT THE NEXT INTERSECTION BEFORE LONG" |
| | TURN RIGHT | TURN RIGHT 1 | "TURN RIGHT AT THE NEXT INTERSECTION BEFORE LONG" |
| | TURN LEFT | TURN LEFT 1 | "TURN LEFT AT THE NEXT INTERSECTION BEFORE LONG" |
| 0.7 km ≦ ℓ < 1.5 km | GO STRAIGHT | GO STRAIGHT 2 | "GO STRAIGHT AT THE INTERSECTION BEING 1km AHEAD" |
| | TURN RIGHT | TURN RIGHT 2 | "TURN RIGHT AT THE INTERSECTION BEING 1km AHEAD" |
| | TURN LEFT | TURN LEFT 2 | "TURN LEFT AT THE INTERSECTION BEING 1km AHEAD" |
| 9.5 km ≦ ℓ < 10.5 km | GO STRAIGHT | GO STRAIGHT 10 | "GO STRAIGHT AT THE INTERSECTION BEING 10km AHEAD" |
| | TURN RIGHT | TURN RIGHT 10 | "TURN RIGHT AT THE INTERSECTION BEING 10km AHEAD" |
| | TURN LEFT | TURN LEFT 10 | "TURN LEFT AT THE INTERSECTION BEING 10km AHEAD" |
| 10.5 km ≦ ℓ | — | FOLLOW | "FOLLOW THE ROAD MORE THAN 10km" |

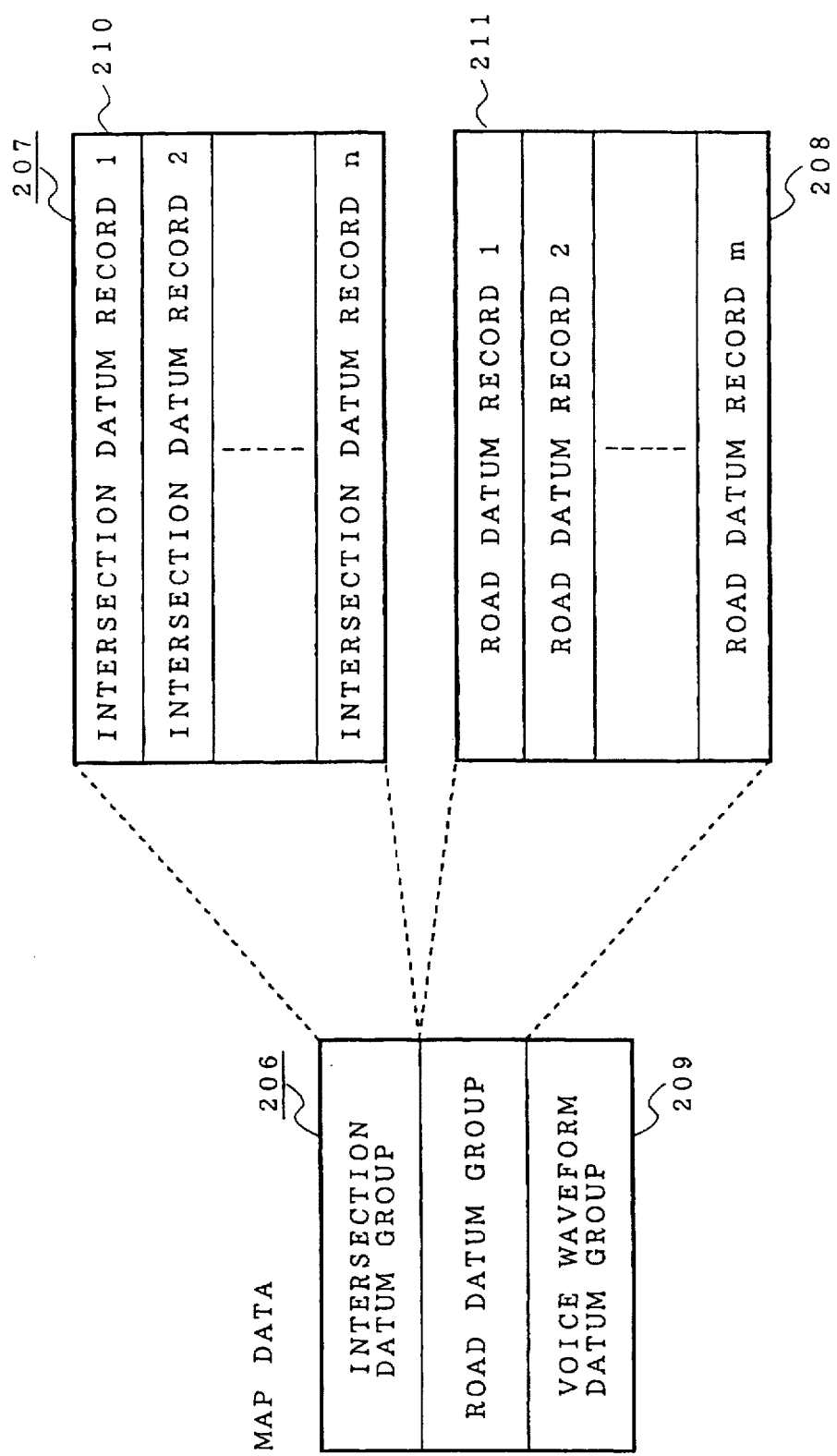

FIG. 31B

ROAD DATUM RECORD 211

| ROAD NUMBER | — 218 |
| INTERSECTION NUMBER ON START POINT SIDE | — 219 |
| INTERSECTION NUMBER ON TERMINAL POINT SIDE | — 220 |
| NUMBER OF INTERPOLATED POINTS (m) | — 221 |
| COORDINATES ON START POINT SIDE | — 222 |
| COORDINATES OF INTERPOLATED POINT 1 | — 223 |
| COORDINATES OF INTERPOLATED POINT 2 | |
| ----- | |
| COORDINATES OF INTERPOLATED POINT m | |
| COORDINATES ON TERMINAL POINT SIDE | — 224 |

FIG. 31A

INTERSECTION DATUM RECORD 210

| INTERSECTION NUMBER | — 212 |
| INTERSECTION COORDINATES | — 213 |
| TWO-LEVEL CROSSING INTERSECTION FLAG | — 214 |
| NUMBER OF CONNECTING ROADS (n) | — 215 |
| ROAD NUMBER 1 | — 216 |
| DISTANCE OF SERVICE ROAD CONCERNING ROAD NUMBER 1 | — 217 |
| ROAD NUMBER 2 | |
| DISTANCE OF SERVICE ROAD CONCERNING ROAD NUMBER 2 | |
| ----- | |
| ROAD NUMBER n | |
| DISTANCE OF SERVICE ROAD CONCERNING ROAD NUMBER n | |

FIG. 33

| ADVANCING DIRECTION | CLASSIFICATION TRAIN OF VOICE WAVEFORMS |
|---|---|
| GO STRAIGHT | CLASSIFICATION OF VOICE WAVEFORM 1 +CLASSSIFICATION OF VOICE WAVEFORM 2 |
| TURN RIGHT | CLASSIFICATION OF VOICE WAVEFORM 1 +CLASSIFICATION OF VOICE WAVEFORM 3 |
| TURN LEFT | CLASSIFICATION OF VOICE WAVEFORM 1 +CLASSIFICATION OF VOICE WAVEFORM 4 |

| NUMBER OF CLASSIFICATION OF VOICE WAVEFORM | CONTENTS OF VOICE |
|---|---|
| 1 | "AT THE NEXT INTERSECTION" |
| 2 | "GO STRAIGHT" |
| 3 | "TURN RIGHT" |
| 4 | "TURN LEFT" |
| 5 | "GO THROUGH THE SERVICE ROAD" |

FIG. 40A

INTERSECTION DATUM RECORD 310

| INTERSECTION NUMBER | INTERSECTION COORDINATES | NUMBER OF CONNECTING ROADS (n) | ROAD NUMBER 1 | ROAD NUMBER 2 | ---- | ROAD NUMBER n |
|---|---|---|---|---|---|---|
| | | | 312 | 313 | 314 | 315 |

FIG. 40B

ROAD DATUM RECORD 311

| ROAD NUMBER | INTERSECTION NUMBER ON START POINT SIDE | INTERSECTION NUMBER ON TERMINAL POINT SIDE | NUMBER OF INTERPOLATED POINTS (m) | COORDINATES ON START POINT SIDE | COORDINATES OF INTERPOLATED POINT 1 | COORDINATES OF INTERPOLATED POINT 2 | ---- | COORDINATES OF INTERPOLATED POINT m | COORDINATES ON TERMINAL POINT SIDE |
|---|---|---|---|---|---|---|---|---|---|
| 316 | 317 | 318 | 319 | 320 | 321 | | | 322 | |

FIG. 42

| ADVANCING DIRECTION | CLASSIFICATION OF VOICE WAVEFORM |
|---|---|
| RIGHT | TURN RIGHT |
| LEFT | TURN LEFT |

… 
IN-CAR NAVIGATION APPARATUS WITH VOICE GUIDANCE

BACKGROUND OF THE INVENTION

1. Field of the Invention

This invention relates to an in-car navigation apparatus, and more particularly relates to an in-car navigation apparatus for guiding a moving body such as a car along a drive route thereof on a road map previously set with digitized map data by informing a voice message when the occasion demands.

2. Description of the Prior Art

FIG. 44 is a block diagram showing the outline of the construction of a conventional in-car navigation apparatus disclosed in, for example, Japanese Published Unexamined Patent Application No. 96389/94 (Tokkai-Hei 6-96389). In the figure, reference numeral 401 denotes a map information memorizing section for storing digitized map data; reference numeral 402 denotes a route setting section for setting a drive route between two points on a map; reference numeral 403 denotes a present position detecting section for detecting the present position of a moving body installing the in-car navigation apparatus; reference numeral 404 denotes a voice message producing section for producing a voice message (or a guide sentence) concerning a predetermined position on a drive route set by the route setting section 402 with digitized map data, and for transmitting the voice message at a predetermined timing set on the present position of the moving body and the drive route thereof; reference numeral 405 denotes a voice signal synthesizing section for synthesizing a voice signal corresponding to the voice message produced by the voice message producing section 404; and reference numeral 406 denotes a display section for displaying the map, the present position and the drive route.

In operation, after the route setting section 402 has set a drive route from a start point to a goal point, the voice message producing section 404 produces voice messages concerning each of a plurality of intersections on the drive route. On producing voice messages, the voice message producing section 404 basically uses fixed type voice messages, in spite of changing them after due consideration of the past drive history of intersections in some cases. After producing voice messages concerning each intersection on the drive route, the voice message producing section 404 transmits them at a predetermined timing set on the information concerning the drive route and the present position detected by the present position detecting section 403. The timing of transmitting the voice messages is the time when the moving body arrives at positions ahead of a predetermined distance from each of the intersections on the drive route.

As described above, the conventional in-car navigation apparatus guides a moving body by producing voice messages concerning intersections on a set drive route for voice-informing for guiding the moving body and supplying voice signals representing the voice messages to a motorist of the moving body as voices at a predetermined timing.

The conventional in-car navigation apparatus is constructed to produce voice messages by means of software. Therefore, it is necessary to change the program thereof in case of changing sentence patterns of the voice messages and of translating the voice messages into other languages. Consequently, it has a problem that it takes a long time to develop into an article.

The conventional in-car navigation apparatus changes the voice messages thereof after due consideration of the past drive history of intersections, but in ordinary cases it is constructed to transmit fixed type voice messages at a prescribed timing. Consequently, it has a problem that it also informs even unnecessary information to a motorist of the moving body which information may check the safe driving thereof.

SUMMARY OF THE INVENTION

In view of the foregoing, it is an object of the present invention to provide an in-car navigation apparatus capable of changing sentence patterns of voice messages and translating them into other languages without changing the program thereof.

It is another object of the present invention to provide an in-car navigation apparatus capable of ensuring safer driving by informing voice messages corresponding to distances up to an intersection and the kind of the intersection.

It is a further object of the present invention to provide an in-car navigation apparatus capable of easily finding an arbitrary set point set by a motorist of a moving body on a road map during driving.

According to the first aspect of the present invention, for achieving the above-mentioned objects, there is provided an in-car navigation apparatus comprising a detachable voice information memorizing means for storing a plurality of voice message pattern codes respectively corresponding to a plurality of voice message concepts to be informed to a motorist of a moving body, and for storing a plurality of voice waveform data respectively corresponding to the plurality of voice message pattern codes, and a control means for determining at least a voice informing point on a drive route set by a route setting means on the basis of the detected present position of the moving body and the digitized map data, and a concept of a voice message to be informed at the point, and for reading out a voice message pattern code corresponding to the concept of a determined voice message from the voice information memorizing means, and for outputting an instruction for reading out a voice waveform datum corresponding to the voice message pattern code.

As stated above, in the in-car navigation apparatus according to the first aspect of the present invention, the detachable voice information memorizing means stores the plurality of voice message pattern codes respectively corresponding to the plurality of voice message concepts to be informed to the motorist of the moving body, and stores the plurality of voice waveform data respectively corresponding to the plurality of voice message pattern codes. Namely, only the concepts of voice messages to be informed are generated by the program thereof, and sentence patterns corresponding to the concepts of voice messages are memorized in a detachable voice information memorizing means such as a CD-ROM and a magnetic storage medium in the form of a table. And, the control means determines at least a voice informing point on a drive route set by a route setting means on the basis of the detected present position of the moving body and the digitized map data memorized in a map information memorizing means, and a concept of a voice message to be informed at the point, and reads out a voice message pattern code corresponding to the concept of the determined voice message from the voice information memorizing means. Then, the control means outputs an instruction to read out the voice waveform datum corresponding to the voice message pattern code for informing with voice to the motorist of the moving body. Consequently, it is easily enabled to guide with voice by means of voice messages having different sentence patterns or voice messages translated into foreign languages by changing the contents of voice messages memorized in the voice information memorizing means without changing the program.

According to the second aspect of the present invention, there is provided an in-car navigation apparatus comprising a point setting means for setting a set point at an arbitrary position on a map, where digitized map data are spread, by means of an input of a motorist of a moving body, wherein a control means comprises an instructing means for calculating a distance between a detected present position of the moving body and the set point, and for instructing a voice message informing means to determine a direction of the set point to the advancing direction of the moving body when the calculated distance is within a prescribed distance, and to select a voice message concept in accordance with the direction to read out a corresponding voice waveform datum.

As stated above, in the in-car navigation apparatus according to the second aspect of the present invention, an arbitrary set point is set at an arbitrary position on a map, where digitized map data are spread, by means of an input of the motorist of a moving body. And, the control means calculates a distance between the detected present position of the moving body and the set point, and determines the direction of the set point to the advancing direction of the moving body when the calculated distance is within a prescribed distance. Besides, the control means instructs the voice message informing means to select a voice message concept in accordance with the direction to read out a corresponding voice waveform datum. Consequently, when the moving body approaches to the vicinity of the set point, the motorist can easily find the set point during driving by the voice information of the direction of the set point as well as the fact of approaching at the same time, for example.

According to the third aspect of the present invention, there is provided an in-car navigation apparatus comprising an intersection to be guided detecting means for detecting an intersection on a drive route to be guided by voice information and an advancing direction from the intersection to be guided by voice information, wherein a control means comprises an instructing means for calculating a distance between the intersection to be guided by voice information and a detected present position of a moving body, and for instructing a voice message informing means to select a voice message concept indicating a distance up to the intersection to be guided by voice information and an advancing direction from the intersection to be guided by voice information if the calculated distance is within a prescribed distance, and to select a voice message concept indicating an effect of following a road where the moving body is driving if the calculated distance exceeds the prescribed distance, and to read out a corresponding voice waveform datum.

As stated above, in the in-car navigation apparatus according to the third aspect of the present invention, the intersection to be guided detecting means detects an intersection on a drive route to be guided by voice information and an advancing direction from the intersection to be guided by voice information. And, the control means calculates the distance between the intersection to be guided by voice information and the detected present position of the moving body, and selects a voice message concept indicating the distance up to the intersection to be guided by voice information and the advancing direction from the intersection to be guided by voice information if the calculated distance is within a prescribed distance, and selects a voice message concept indicating the effect of following a road where the moving body is driving if the calculated distance exceeds the prescribed distance. Consequently, the motorist of a moving body, or the like can concentrate on driving without hearing the information unnecessary for the present, and safer driving is enabled.

According to the fourth aspect of the present invention, there is provided an in-car navigation apparatus, wherein the control means thereof comprises an instructing means for judging whether an intersection being ahead of a detected present position of a moving body is an intersection where a road forks through a service road or not on the basis of digitized map data, a drive route set by a drive route setting means and the present position, and for instructing a voice message informing means to hasten timing of informing a voice message earlier than that of an ordinary intersection, and to select a voice message concept having voice information indicating the effect of driving through a service road to read out a corresponding voice waveform datum in case of the intersection where a road forks through a service road.

As stated above, in the in-car navigation apparatus according to the fourth aspect of the present invention, the control means thereof judges whether an intersection being ahead of a detected present position of a moving body is an intersection where a road forks through a service road or not on the basis of digitized map data, a set drive route and the present position, and hastens the timing of informing a voice message earlier than that of an ordinary intersection, and further selects a voice message concept having voice information indicating the effect of driving through a service road in case of the intersection where a road forks through a service road. Consequently, the motorist of a moving body, or the like can prepare to branch off to a service road earlier for enabling safer driving.

According to the fifth aspect of the present invention, there is Provided an in-car navigation apparatus, where in the control means thereof comprises an instructing means for instructing a voice message informing means to select a voice message concept indicating the effect of turning right or left if a moving body is to turn right or left at an intersection being ahead of the present position of the moving body on the drive route thereof, and to select a warning sound if the moving body is to go straight on, and to read out a corresponding voice waveform datum.

As stated above, in the in-car navigation apparatus according to the fifth aspect of the present invention, the control means thereof selects a voice message concept indicating the effect of turning right or left if a moving body is to turn right or left at an intersection being ahead of the present position of the moving body on the drive route thereof, and selects a warning sound if the moving body is to go straight on. Consequently, the motorist of a moving body, or the like can confirm the intersection, and can concentrate on driving without hearing the unnecessary information. Therefore, safer driving is enabled.

According to the sixth aspect of the present invention, there is provided an in-car navigation apparatus comprising a control means for calculating a distance between a detected present position of a moving body and a set point, and for determining the direction of the set point to the advancing direction of the moving body if the calculated distance is within a prescribed distance to output an instruction to select a voice message in accordance with the determined direction to a voice message informing means.

As stated above, the in-car navigation apparatus according to the sixth aspect of the present invention sets an arbitrary set point at an arbitrary position on a map, where digitized map data are spread, by means of the input of a motorist of a moving body. And, the control means calculates the distance between the detected present position of the moving body and the set point, and determines the direction of the set point to the advancing direction of the moving body if the calculated distance is within a prescribed distance. Besides, the control means selects a voice message in accordance with the determined direction. Consequently, when the moving body approaches to the vicinity of the set point, the motorist can easily find the set point during driving by the voice information of the direction of the set point as well as the fact of approaching at the same time, for example.

According to the seventh aspect of the present invention, there is provided an in-car navigation apparatus comprising an intersection to be guided detecting means for detecting an intersection on a drive route to be guided by voice information and an advancing direction from the intersection to be guided by voice information, and a control means for calculating a distance between the intersection to be guided by voice information and a detected present position of a moving body, and for outputting an instruction to select a voice message indicating a distance up to the intersection to be guided by voice information and an advancing direction from the intersection to be guided by voice information if a calculated distance is within a prescribed distance, and to select a voice message indicating the effect of following a road where the moving body is driving if the calculated distance exceeds the prescribed distance to a voice message informing means.

As stated above, in the in-car navigation apparatus according to the seventh aspect of the present invention, the intersection to be guided detecting means detects an intersection on a drive route to be guided by voice information and an advancing direction from the intersection to be guided by voice information on the basis of digitized map data and the drive route set by a route setting means. The control means calculates the distance between the intersection to be guided by voice information and the detected present, and selects a voice message indicating a distance up to the intersection to be guided by voice information and the advancing direction from the intersection to be guided by voice information if the calculated distance is within a prescribed distance, and further selects a voice message indicating the effect of following the road where the moving body is driving if the calculated distance exceeds the prescribed distance. Consequently, the motorist of a moving body, or the like can concentrate on driving without hearing the information unnecessary for the present, and safer driving is enabled.

According to the eighth aspect of the present invention, there is provided an in-car navigation apparatus comprising a control means for judging whether an intersection being ahead of a detected present position of a moving body is an intersection where a road forks through a service road or not on the basis of digitized map data, a drive route set by a drive route setting means and the present position, and for outputting an instruction to hasten the timing of informing a voice message earlier than that of an ordinary intersection, and to select a voice message having voice information indicating the effect of driving through a service road in case of the intersection where a road forks through a service road, to a voice message informing means.

As stated above, in the in-car navigation apparatus according to the eighth aspect of the present invention, the control means judges whether an intersection being ahead of the detected present position of a moving body is an intersection where a road forks through a service road or not on the basis of digitized map data, a drive route set by the drive route setting means and the present position, and hastens the timing of informing a voice message earlier than that of an ordinary intersection, and further selects a voice message having the voice information indicating the effect of driving through a service road in case of the intersection where a road forks through a service road. Consequently, the motorist of a moving body, or the like can prepare to branch off to a service road earlier for enabling safer driving.

According to the ninth aspect of the present invention, there is provided an in-car navigation apparatus comprising a control means for outputting an instruction to select a voice message indicating the effect of turning right or left if a moving body is to turn right or left at an intersection being ahead of the present position of the moving body on the drive route thereof, and to select a warning sound if the moving body is to go straight on, to a voice message informing means.

As stated above, in the in-car navigation apparatus according to the ninth aspect of the present invention, the control means selects a voice message indicating the effect of turning right or left if a moving body is to turn right or left at an intersection being ahead of the present position of the moving body on the drive route thereof, and selects a warning sound if the moving body is to go straight on. Consequently, the motorist of a moving body, or t he like can confirm the intersection, and can concentrate on driving without hearing the unnecessary information. Therefore, safer driving is enabled.

BRIEF DESCRIPTION OF THE DRAWINGS

Further objects and advantages of the present invention can be more fully understood from the following detailed description taken in conjunction with the accompanying drawings. It is to be expressly understood, however, that the drawings are for purpose of illustration only and are not intended as a definition of the limits of the invention.

FIG. 2 is a chart showing the construction of the digitized map data of the in-car navigation apparatus shown in FIG. 1;

FIG. 3(a) and FIG. 3(b) are charts respectively showing the construction of the intersection datum record and the construction of the road datum record constituting the digitized map data shown in FIG. 2;

FIG. 5(a) and FIG. 5(b) are charts respectively showing the construction of the voice waveform data managing record and the construction of the digitized waveform data constituting the voice waveform data shown in FIG. 4;

FIG. 7 is a chart showing the construction of the concept message pattern table constituting the concept message table shown in FIG. 6;

FIG. 10 is a chart showing the construction of the retrieval table datum record constituting the concept table shown in FIG. 8;

FIG. 16(a) and FIG. 16(b) are charts respectively showing the construction of the intersection datum record and the construction of the road datum record constituting the digitized map data shown in FIG. 15;

FIG. 20 is a chart showing the construction of the table illustrating the correspondence between angles and classifications of voice waveforms in the in-car navigation apparatus shown in FIG. 14;

FIG. 24(a) and FIG. 24(b) are charts respectively showing the construction of the intersection datum record and the construction of the road datum record constituting the digitized map data shown in FIG. 23:

FIG. 26 is a chart showing the construction of the table illustrating the correspondence between advancing directions and classifications of voice waveforms in the in-car navigation apparatus shown in FIG. 22;

FIG. 30 is a chart showing the construction of the digitized map data of the in-car navigation apparatus shown in FIG. 29;

FIG. 31(a) and FIG. 31(b) are charts respectively showing the construction of the intersection datum record and the construction of the road datum record constituting the digitized map data shown in FIG. 30;

FIG. 33 is a chart showing the construction of the table illustrating the correspondence between advancing directions and classifications of voice waveforms in the in-car navigation apparatus shown in FIG. 29;

FIG. 34 is a chart showing examples of the contents of voices meant by the classifications of voice waveforms shown in FIG. 33;

FIG. 40(a) and FIG. 40(b) are charts respectively showing the construction of the intersection datum record and the construction of the road datum record constituting the digitized map data shown in FIG. 39;

FIG. 42 is a chart showing the construction of the table illustrating the correspondence between advancing directions and classifications of voice waveforms in the in-car navigation apparatus shown in FIG. 38;

DETAILED DESCRIPTION OF THE PREFERRED EMBODIMENTS

Preferred embodiments of the present invention will now be described in detail with reference to the accompanying drawings.

EMBODIMENT 1

Figure 1:
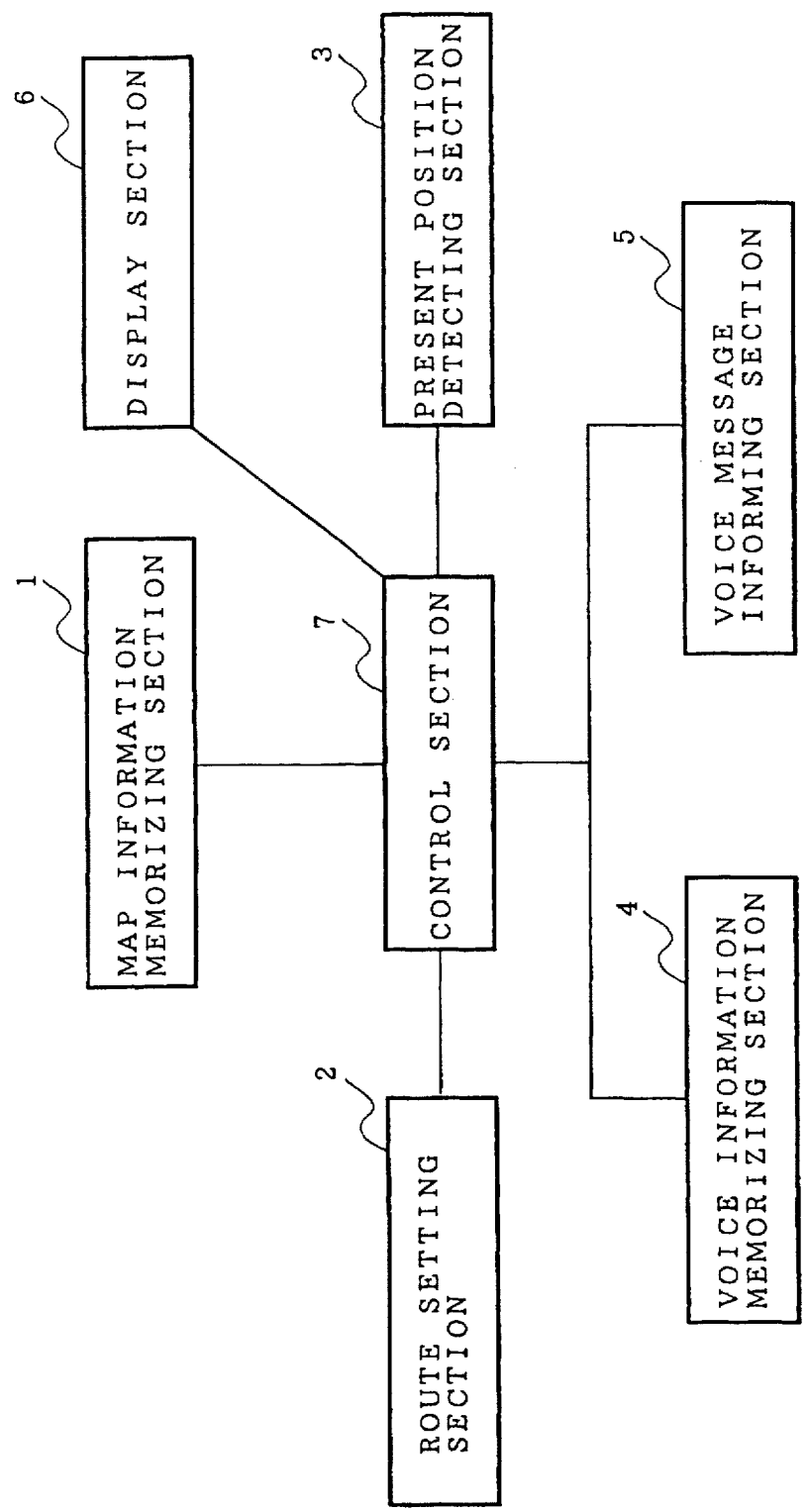
FIG. 1 is a block diagram showing the construction of the in-car navigation apparatus according to an embodiment of the present invention.

FIG. 1 is a block diagram schematically showing the construction of the in-car navigation apparatus according to an embodiment of the present invention. In the figure, reference numeral 1 denotes a map information memorizing section (or a map information memorizing means) for storing digitized map data; reference numeral 2 denotes a route setting section (or a route setting means) for setting a drive route between two points on a map; reference numeral 3 denotes a present position detecting section (or a present position detecting means) for detecting a present position of a moving body installing the in-car navigation apparatus on the information by Global Positioning System (hereinafter referred to as GPS information); reference numeral 4 denotes a voice information memorizing section (or a voice information memorizing means) for storing digitized voice waveform data and a concept message table tabularizing voice message pattern data corresponding to concepts of voice messages, which voice information memorizing section 4 is a CD-ROM, a magnetic storage medium, and so forth being detachable from the in-car navigation apparatus; reference numeral 5 denotes a voice message informing section (or a voice message informing means) for reading out a voice waveform datum memorized in the voice information memorizing section 4 to inform a voice message after executing the digital-to-analogue conversion of the datum; reference numeral 6 denotes a display section for displaying a map, a present position and a drive route; and reference numeral 7 denotes a control section for determining a point where a voice message is to be informed on a drive route and a concept of a voice message, and for reading out a corresponding voice message pattern from the voice information memorizing section 4 to instruct the voice message informing section 5 to inform a voice message corresponding to the voice message pattern.

FIG. 2, FIG. 3(a) and FIG. 3(b) are charts showing the constructions of digitized map data memorized in the map information memorizing section 1. In these figures, reference numeral 8 denotes the whole digitized map data; reference numeral 9 denotes an intersection datum group being one of the composing elements of the digitized map data 8 and being a set of data concerning intersections; reference numeral 10 denotes a road datum group being the other composing element and being a set of data concerning roads; reference numeral 11 denotes an intersection datum record constituted of various data concerning one intersection; and reference numeral 12 denotes a road datum record constituted of various data concerning one road. In FIG. 3(a) and FIG. 3(b), reference numeral 13 denotes an intersection number indicating an I.D. number given to an intersection uniquely; reference numeral 14 denotes intersection coordinates indicating the position of an intersection on a map by longitude and latitude, or the like; reference numeral 15 denotes a number of connecting roads representing the number of roads connected to an intersection; and reference numeral 16 denotes road numbers of the connected roads. Reference numeral 17 denotes a road number indicating an I.D. number given to a road uniquely; reference numeral 18 denotes an intersection number on a start point side indicating an intersection connected to the start point side of a road; reference numeral 19 denotes an intersection number on a terminal point side indicating an intersection connected to the terminal point side of a road; reference numeral 20 denotes a number of interpolated points being bent points existing between the start point and the terminal point of a road; reference numeral 21 denotes coordinates of an interpolated point indicating a position of an interpolated point by longitude and latitude, or the like; reference numeral 22 denotes coordinates on a start point side indicating the position of the start point of a road by longitude and latitude, or the like; and reference numeral 23 denotes coordinates on a terminal point side indicating the position of the terminal point of a road by longitude and latitude, or the like.

Figure 4:
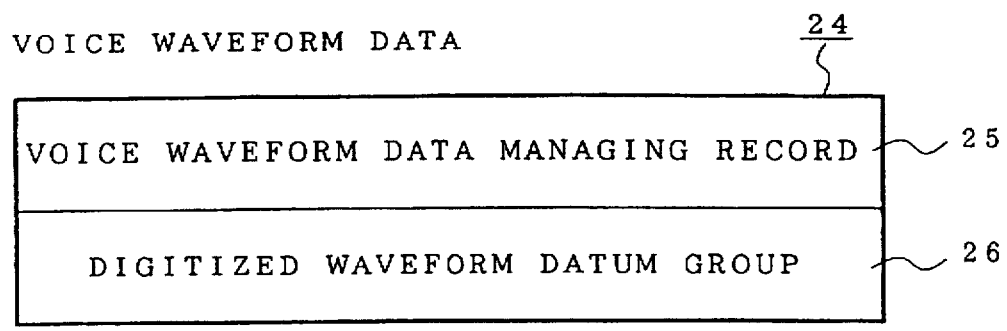
FIG. 4 is a chart showing the voice waveform data of the in-car navigation apparatus shown in FIG. 1.

FIG. 4 through FIG. 10 are charts showing the constructions of the voice waveform data and the concept message table memorized in the voice information memorizing section 4; FIG. 4, FIG. 5(a) and FIG. 5(b) among them are charts showing the construction of the voice waveform data; and FIG. 6 through FIG. 10 are charts showing the construction of the concept message table. In FIG. 4, reference numeral 24 denotes a voice waveform datum group showing the whole voice waveform data; reference numeral 25 denotes a voice waveform data managing record, one of the composing elements of the voice waveform datum group 24, for managing voice waveform data; reference numeral 26 denotes a digitized waveform datum group being the other composing element of the voice waveform data group 24 and being a set of digitized waveform data which are voice waveform digitized by analogue-to-digital conversion. In FIG. 5(a) and FIG. 5(b), reference numeral 27 denotes a waveform code indicating an I.D. number given to each voice waveform uniquely; reference numeral 28 denotes a pointer indicating the position of a waveform datum corresponding to the waveform code 27 in the digitized waveform data 26; reference numeral 29 denotes voice contents representing the meaning of the waveform code 27 for convenience's sake; and reference numeral 30 denotes the smallest unit of a digitized waveform datum constituting the digitized waveform datum group 26.

Figure 6:
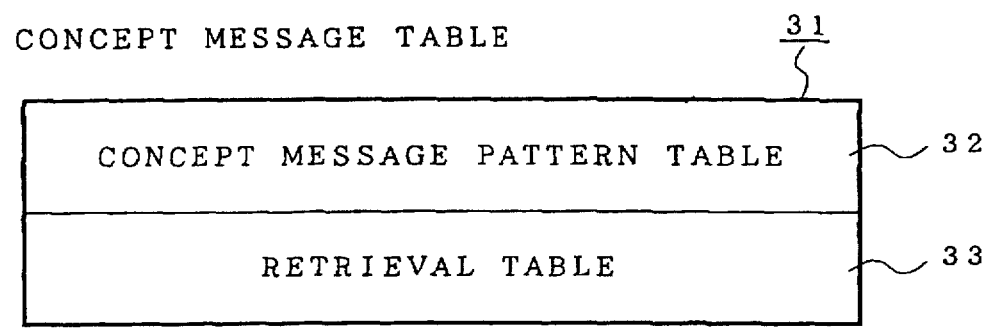
FIG. 6 is a chart showing the construction of the concept message table of the in-car navigation apparatus shown in FIG. 1.

In FIG. 6, reference numeral 31 indicates the whole concept message table; reference numeral 32 denotes a concept message pattern table being one of the composing elements of the concept table and representing the code train of a message pattern corresponding to a concept of a voice message; reference numeral 33 denotes a retrieval table being the other composing element of the concept message table, and for retrieving wave codes concerning a distance, a direction and a place name. In FIG. 7, reference numeral 34 denotes concepts of voice messages which include three kinds of voice messages corresponding to distances up to a goal point, "instruction 1", "instruction 2" and "arrival", in the present embodiment. Reference numeral 35 denotes code trains of message patterns being an enumeration of classifications of waveform codes and retrieval tables, in which parameter "f" indicates classifications of retrieval tables for retrieving wave codes concerning a direction, a place name, a distance, or the like, and, as will be described later, which code trains of message patterns 35 are converted into corresponding waveform codes with the retrieval table 33.

Figure 8:
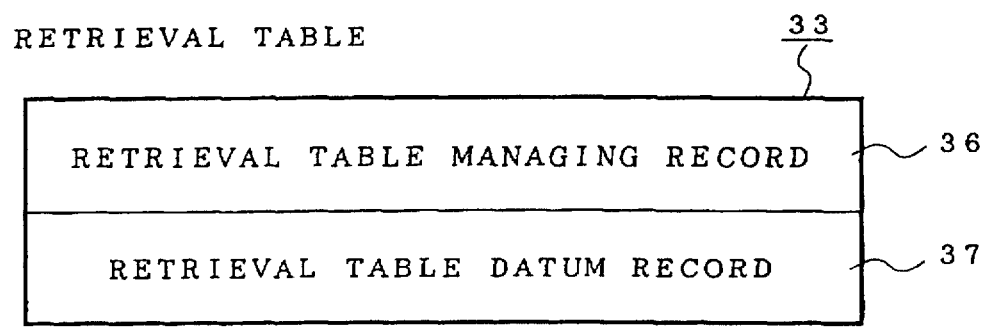
FIG. 8 is a chart showing the construction of the retrieval table constituting the concept message table shown in FIG. 6.
Figure 9:
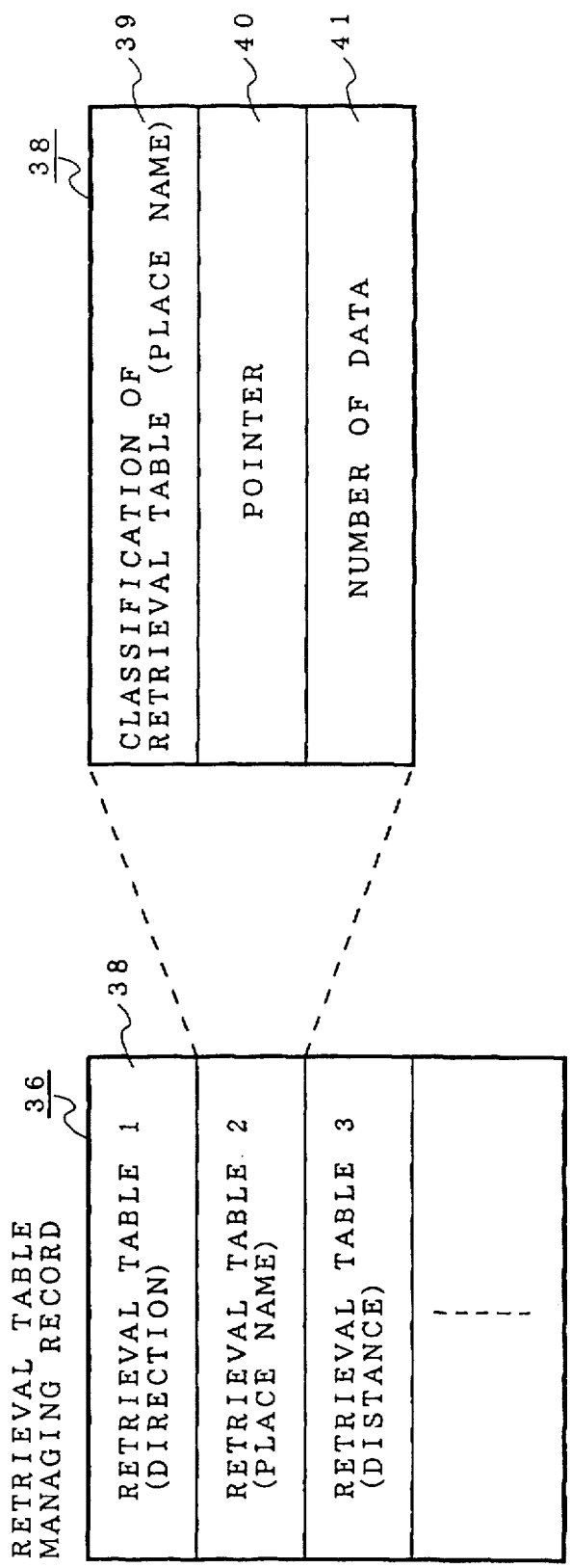
FIG. 9 is a chart showing the construction of the retrieval table managing record constituting the concept table shown in FIG. 8.

In FIG. 8, reference numeral 36 denotes a retrieval table managing record being one of the composing elements of the retrieval table 33, and for managing the retrieval table 33; and reference numeral 37 denotes a retrieval table datum record indicating correspondences between retrieved values and waveform codes. In FIG. 9, reference numeral 38 denotes a managing record being one of the composing elements of the retrieval table managing record 36; reference numeral 39 denotes a classification of retrieval table indicating a classification of the retrieval table such as a direction, a place name and a distance; reference numeral 40 denotes a pointer of the retrieval table represented by the classification of the retrieval table 39, which pointer 40 indicates a position among the retrieval table datum record 37; and reference numeral 41 denotes the number of retrieval table data. In FIG. 10, reference numeral 42 denotes a record number which is appointed by the pointer 40; reference numeral 43 denotes a retrieval value; and reference numeral 44 denotes a waveform code corresponding to the retrieval value 43.

Figure 11:
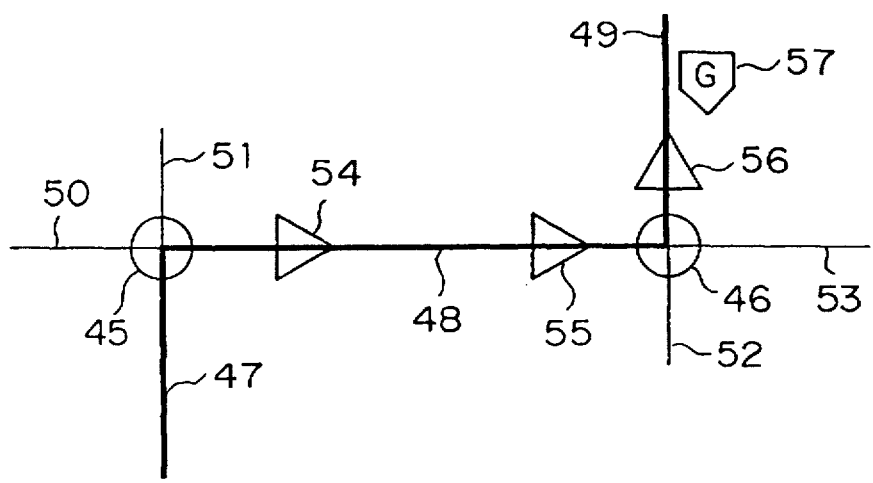
FIG. 11 is a diagram showing an example of drive routes of the in-car navigation apparatus shown in FIG. 1.

FIG. 11 is a diagram showing an example of a drive route set by the route setting section 2. In the figure, reference numerals 45 and 46 denote intersections where voice messages are to be informed, which was determined by the control section 7; reference numerals 47 through 49 denote roads being a drive route; reference numerals 50 through 53 denote roads other than route roads 47, 48 and 49 which roads 50 through 53 are connected to the intersections 45 and 46; reference numerals 54 through 56 denote present positions of a moving body which moves on the drive route; and reference numeral 57 denotes a point set to be a goal point.

Figure 12:
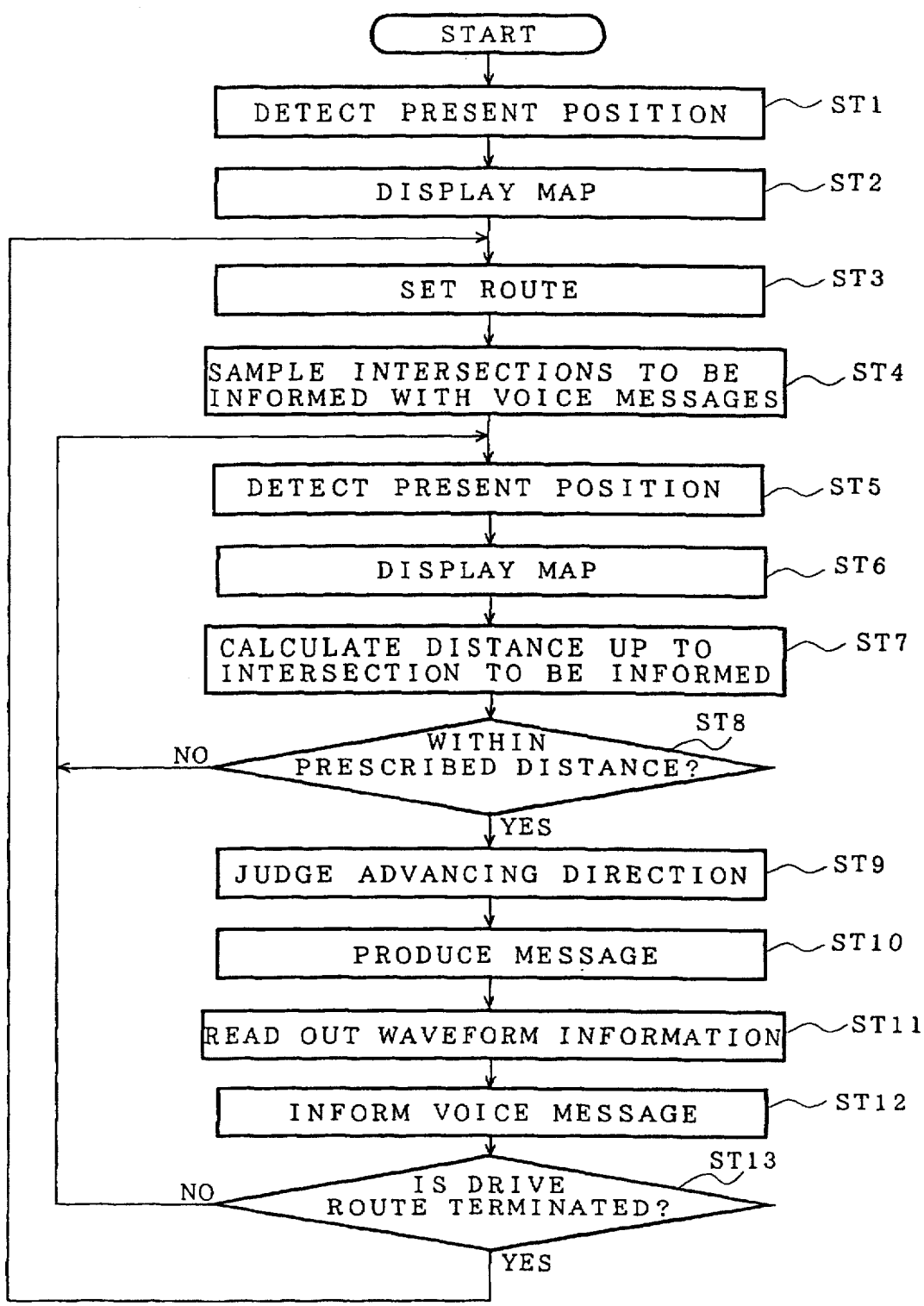
FIG. 12 is a flow chart showing the flow of the process used in the in-car navigation apparatus shown in FIG. 1.
Figure 13:
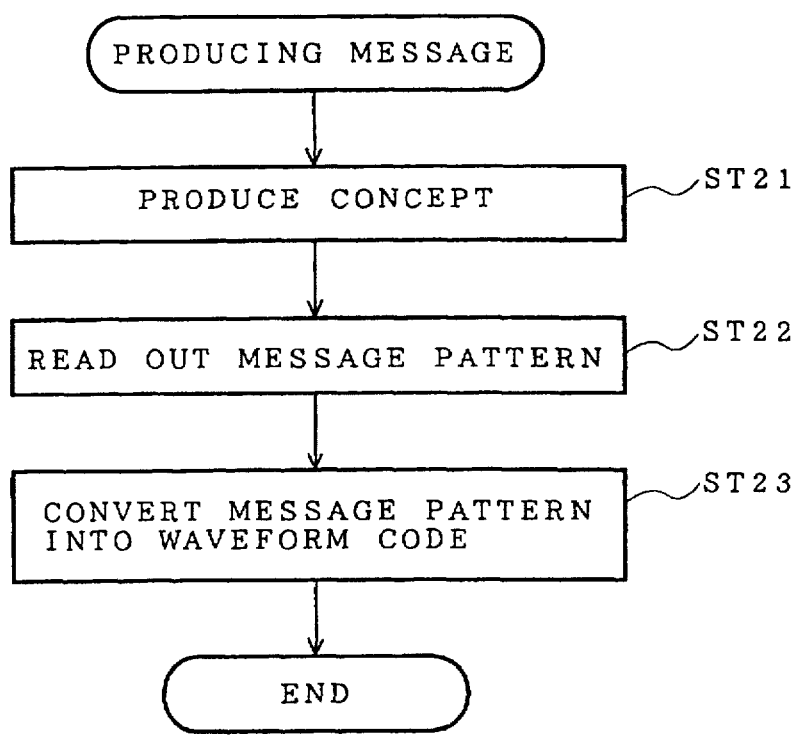
FIG. 13 is a flow chart showing the process concerning the production of a message of the in-car navigation apparatus shown in FIG. 12 in further detail.

FIG. 12 and FIG. 13 are flow charts showing the flow of the process used in the in-car navigation apparatus according to the present embodiment. In the figures, reference characters ST1 through ST13 and ST21 through ST23 denote units of each process.

In operation, as shown in FIG. 12, at step ST1, the control section 7 detects the present position of the moving body on the GPS information or the like with the present position detecting section 3. At step ST2, the control section 7 reads out digitized map data 8 belonging to an arbitrary area around the present position from the map information memorizing section 1, and displays a map on the display section 6 in conformity with the intersection coordinates 14 and the coordinates of an interpolated point 21 of the road datum record 12, which coordinates 14 and 21 are respectively shown in FIG. 3(a) and FIG. 3(b). Next, at step ST3, the route setting section 2 sets two points on the map by the use of longitude and latitude, or the like, and sets a drive route between the two points in conformity with Dijkstra Method, which is a general search algorithm on a network, or the like.

After setting the drive route, at step ST4, the control section 7 samples an intersection, for example, having three roads or more connected to the intersection as a point where a voice message is to be informed. Next, at step ST5, the present position detecting section 3 detects the present position of the moving body again, and at step ST6, the control section 7 again displays a map on the display section 6 on the new present position. At the following step ST7, the control section 7 calculates the distance between the present position and the sampled guide voice informing point by means of their coordinates. At step ST8, the control means 7 judges whether the calculated distance is within several prescribed distances arbitrarily set in advance or not. If the calculated distance is within the prescribed distances, the control section 7 judges the advancing direction of the drive route from the voice informing point at step ST9. The judgement is executed by calculating the angles between the route road flowing into the point and the route road flowing out of the point by using the coordinates on the start point side 22, the coordinates on the terminal point side 23 and the coordinates of an interpolated point 21. Then the control section 7 judges the advancing direction, for example, as follows: if the angle of the route road flowing out to the route road flowing in is within the range of ±45°, the advancing direction is judged to go straight; if the angle is within in the range from 45° through 180°, the advancing direction is judged to turn right; and if the angle is within in the range from 180° through 315°, the advancing direction is judged to turn left. If it becomes clear that the distance calculated at step ST8 is not within the range of the predetermined distances, the control section 7 returns to step ST5 for detecting the present position of the moving body again with the present position detecting section 3, and repeats the operations of step ST5 through step ST7 until the calculated distance is within the range of the prescribed distances.

Next, at step ST10, the control section 7 produces a concept of a voice message on the advancing direction and the distance. After that, the control section 7 operates in conformity with the flow chart shown in FIG. 13. In the voice message producing process, for example, as shown in FIG. 11, if the present position of the moving body is the position 54 far from the intersection 46 being a voice informing point more than a prescribed distance, for example 1 km, the control section 7 produces a concept of the voice message of "instruction 1" shown in FIG. 7; and if the present position is the position 55 within the prescribed distance, the control section 7 produces a concept of the voice message of "instruction 2" shown in FIG. 7 at step ST21. Further, if the present position is the position 56 within a prescribed distance, for example 1 km, from the goal point 57, a set voice informing point, the control section 7 produces a concept of the voice message of "arrival". Then, at step ST22, the control section 7 retrieves the concept message table 31 memorized in the voice information memorizing section 4 for obtaining a code train of a message pattern 35 shown in FIG. 7 corresponding to the produced concept of the voice message. At the following step ST23, the control section 7 produces a code train of a waveform from the retrieved code train of a message pattern 35. An example of the production is shown in the following. In the case where a concept of a voice message of "instruction 2" shown in FIG. 7 is produced, for example, a code train of a message pattern 35 expressed by the following formula can be retrieved on the kind of the concept.

$$100, f(\text{direction})+3000 \tag{1}$$

where number 100 is an immediate value, and is converted into a code of a waveform as it is. Letter f(direction) denotes a retrieval concerning an advancing direction. When the moving body turns left at the intersection 46, as shown in FIG. 11, the control section 7 retrieves the retrieval value 43 of "to the left", shown in FIG. 10, from the retrieval table datum record 37 of the retrieval table concerning a direction with reference to the retrieval table managing record 36 shown in FIG. 9 to obtain a waveform code 44 of "3". The next message pattern code 3000 is an immediate value having a sign "+". Therefore, the formula (1) operates the addition of 3, waveform code 44, to 3000 to generate a waveform code of 3003. Thus, a code train of a waveform shown in the following formula is produced.

$$100, 3003 \tag{2}$$

After finishing the conversion from the code train of a message pattern to the code train of a waveform, the control section 7 returns to the process of the flow chart shown in FIG. 12. At step ST11, the control section 7 reads out a digitized waveform datum 26 by retrieving the voice waveform datum group 24 from the code train of a waveform, and informs the message with voice after converting the digitized waveform datum into analogue waveform. At step ST13, the control section 7 judges whether the drive route has finished or not. If the moving body has not reached to the goal point yet, the control section 7 returns to step ST5, and repeats the above processes up to the end of the drive route.

As described above, the in-car navigation apparatus according to the present embodiment is constructed to produce only the concept of the voice message to be informed with a program, and to memorize the contents of messages corresponding to the concepts in the voice information memorizing section 4, a detachable storage medium. Consequently, it can guide a motorist with voices of different sentence patterns or voices translated into the languages of foreign countries by changing the contents of the voice messages memorized in the storage medium without changing the program.

EMBODIMENT 2

Figure 14:
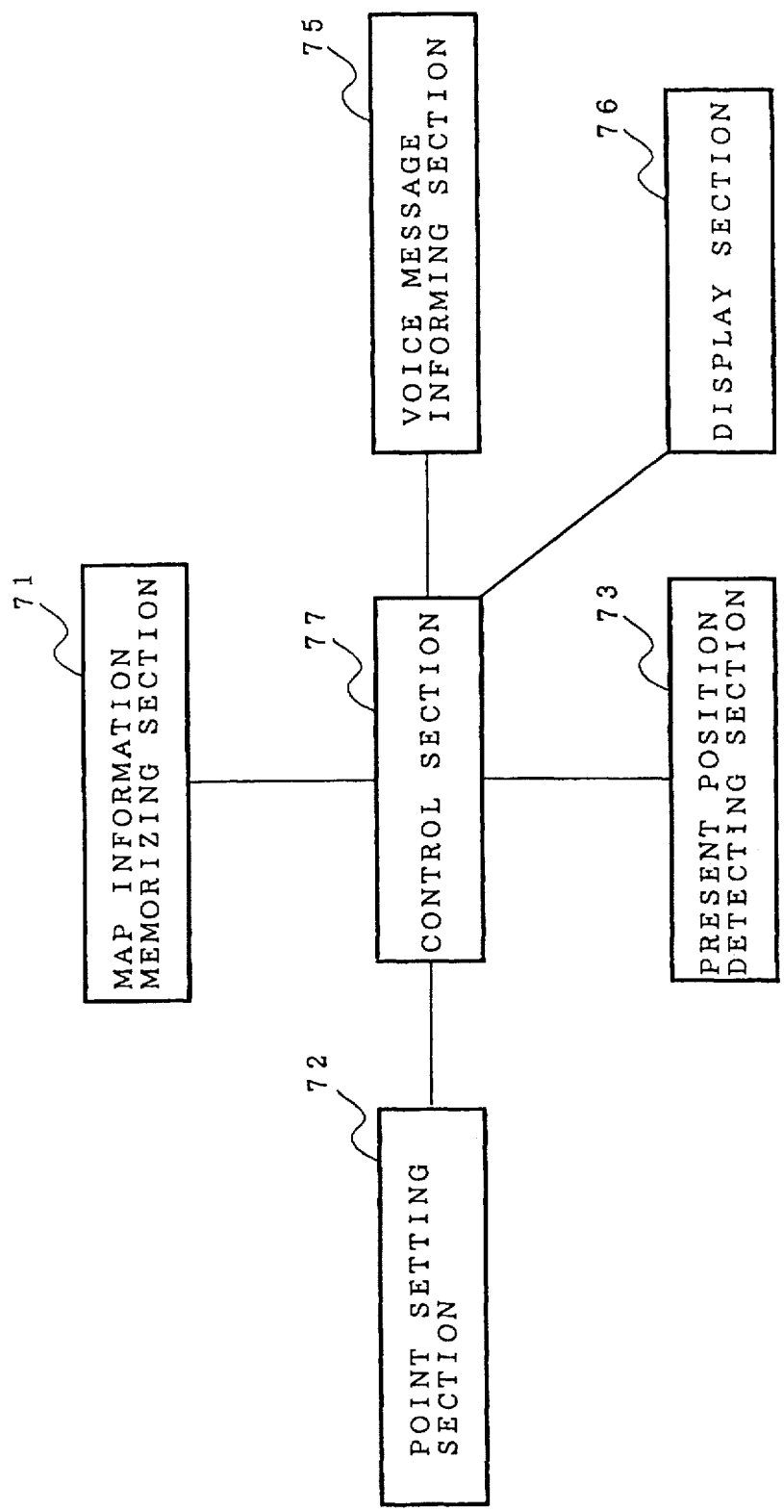
FIG. 14 is a block diagram showing the construction of the in-car navigation apparatus according to another embodiment of the present invention.

FIG. 14 is a block diagram schematically showing the construction of the in-car navigation apparatus according to another embodiment of the present invention. In the figure. reference numeral 71 denotes a map information memorizing section for storing digitized map data; reference numeral 72 denotes a point setting section (or a point setting means) for setting a point at an arbitrary position on a map; reference numeral 73 denotes a present position detecting section for detecting a present position and an advancing direction of a moving body on the GPS information or the like; reference numeral 75 denotes a voice message informing section for reading out a voice waveform datum to inform a voice message after executing the digital-to-analogue conversion of the datum; reference numeral 76 denotes a display section for displaying a map, a present position and a drive route; and reference numeral 77 denotes a control section for calculating a distance between a present position and a set point, and for detecting the direction of the set point to the advancing direction of the moving body when the calculated distance is within a predetermined distance, and for reading out a voice message pattern corresponding to the detected direction from the map information memorizing section 71, and further for outputting an instruction to inform a voice message corresponding to the voice message pattern to the voice message informing section 75.

Figure 15:
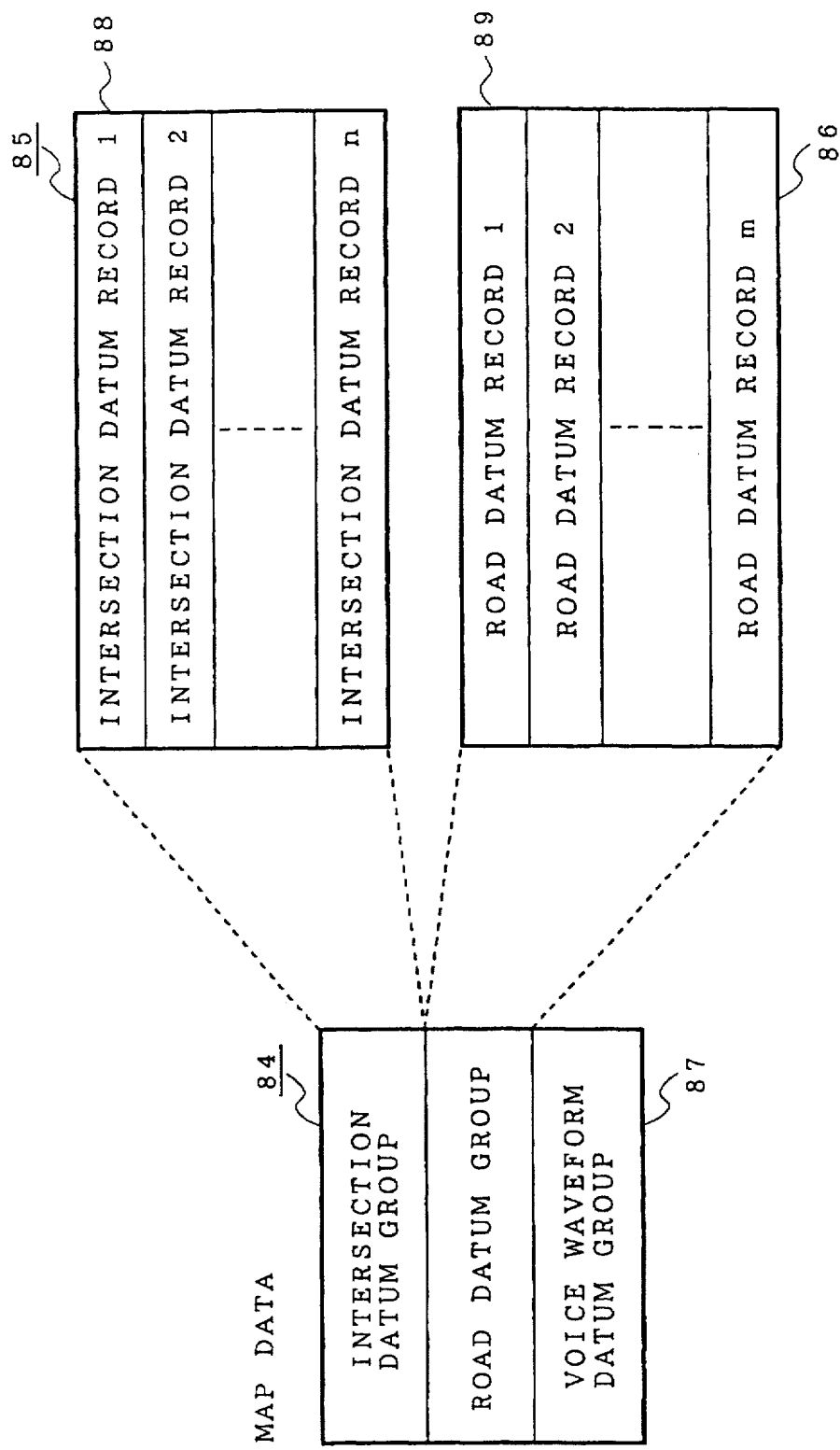
FIG. 15 is a chart showing the construction of the digitized map data of the in-car navigation apparatus shown in FIG. 14.

FIG. 15 through FIG. 17(c) are charts showing the construction of digitized map data memorized in the map information memorizing section 71. In FIG. 15, reference numeral 84 denotes the whole digitized map data; reference numeral 85 denotes an intersection datum group being a first composing element of the digitized map data 84, and being a set of data concerning intersections; reference numeral 86 denotes a road datum group being a second composing element, and being a set of data concerning roads; reference numeral 87 denotes a voice waveform datum group being a third composing element, and being a set of data concerning voice waveforms; reference numeral 88 denotes an intersection datum record constituted of various data concerning one intersection; and reference numeral 89 denotes a road datum record constituted of various data concerning one road. In FIG. 16(a) and FIG. 16(b), reference numeral 90 denotes an intersection number indicating an I.D. number given to an intersection uniquely; reference numeral 91 denotes an intersection coordinates indicating the position of an intersection on a map by longitude and latitude, or the like; reference numeral 92 denotes a number of connecting roads representing the number of roads connected to an intersection; and reference numeral 93 denotes road numbers of the connected roads. Reference numeral 94 denotes a road number indicating an I.D. number given to a road uniquely; reference numeral 95 denotes an intersection number on a start point side indicating an intersection connected to the start point side of a road; reference numeral 96 denotes an intersection number on a terminal point side indicating an intersection connected to the terminal point side of a road: reference numeral 97 denotes a number of interpolated points being bent points existing between the start point and the terminal point of a road: reference numeral 99 denotes coordinates of an interpolated point indicating a position of an interpolated point by longitude and latitude, or the like: reference numeral 98 denotes coordinates on a start point side indicating the position of the start point of a road by longitude and latitude, or the like; and reference numeral 100 denotes coordinates on a terminal point side indicating the position of the terminal point of a road by longitude and latitude, or the like.

Figure 17A:
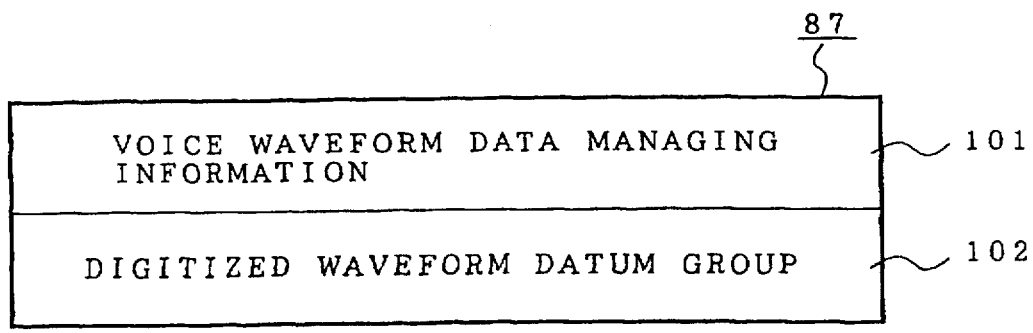
FIG. 17(a), FIG. 17(b) and FIG. 17(c) are charts respectively showing the construction of the voice waveform data, the construction of the voice waveform data managing record and the construction of the digitized waveform data of the in-car navigation apparatus shown in FIG. 14, the latter two of which constitute the voice waveform data.
Figure 17B:
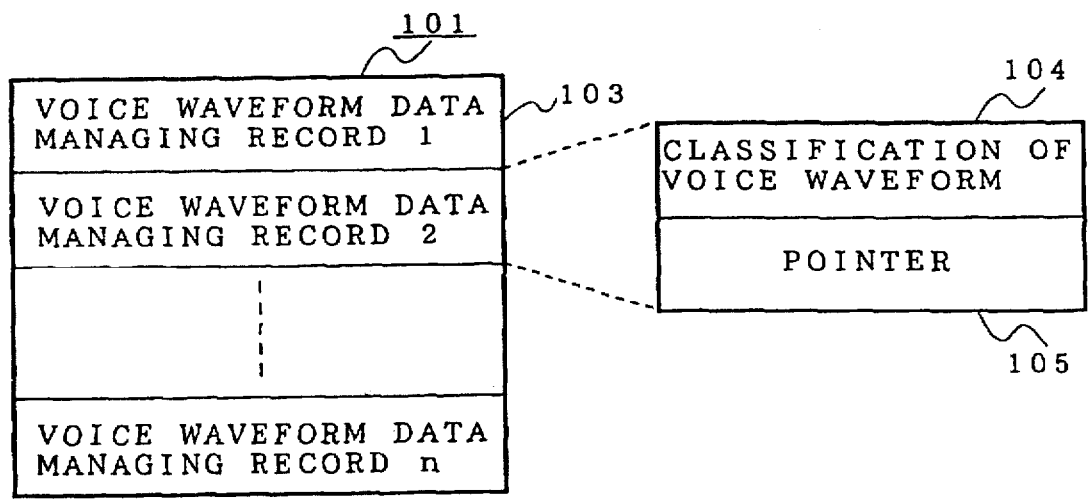
Figure 17C:
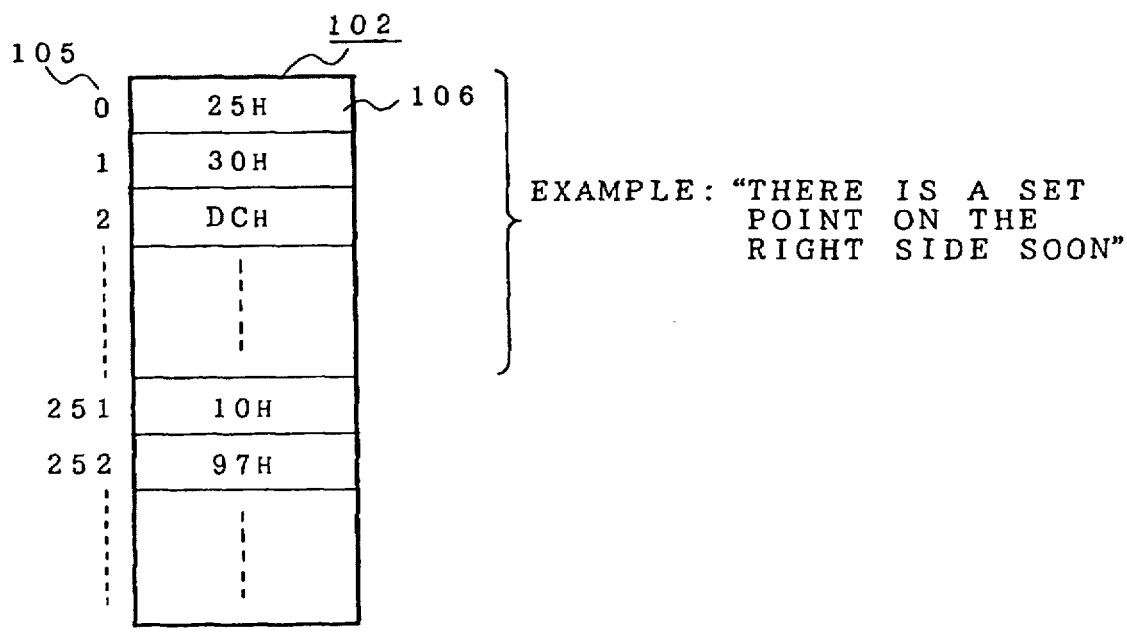

In FIG. 17(a), FIG. 17(b) and FIG. 17(c), reference numeral 101 denotes voice waveform data managing information, one of the composing elements of the voice waveform datum group 87, for storing managing information concerning the contents of voice waveform data; reference numeral 102 denotes a digitized waveform datum group being the other composing element of the voice waveform datum group 87, and being a set of digitized waveform data; reference numeral 103 denotes a voice waveform data managing record for storing the managing information of each unit of voice messages; reference numeral 104 denotes a classification of a voice waveform indicating the classification of a voice message; reference numeral 105 denotes a pointer indicating the position of a corresponding voice waveform datum by the amount of an offset from the front position of the voice waveform datum group 87; and reference numeral 106 denotes the minimum unit of a digitized waveform datum constituting the digitized waveform datum group 102 stored in the map information memorizing section 71 after being converted from an analogue voice waveform to a digitized waveform datum.

Figure 18:
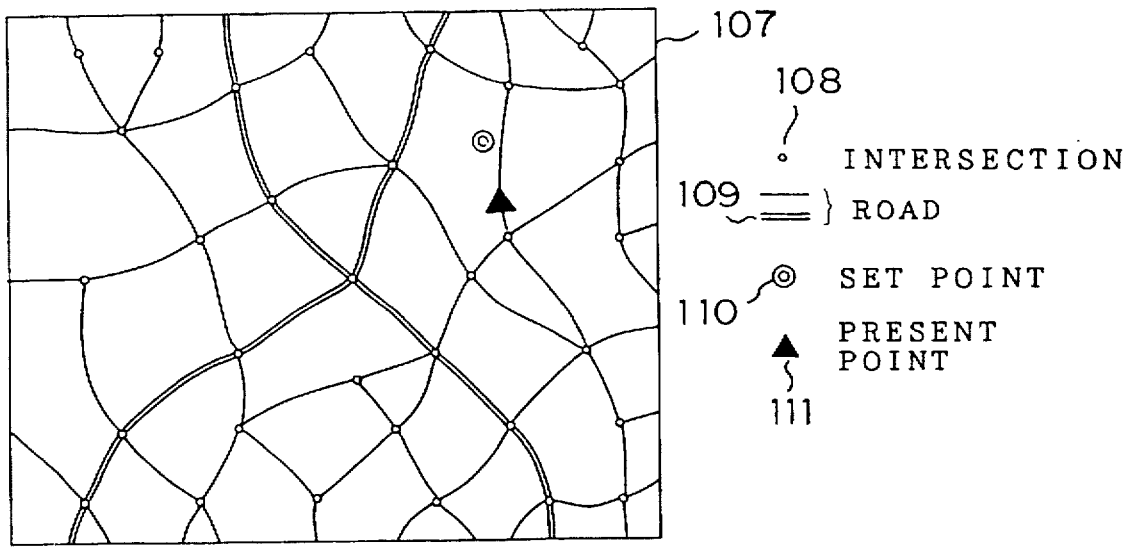
FIG. 18 is an example of a map displayed on the in-car navigation apparatus shown in FIG. 14.

FIG. 18 is a diagram showing an example of a map, a present position and a set point displayed on the display section 76. In the figure, reference numeral 107 denotes the whole of the displayed map and so forth; reference numeral 108 denotes intersections; reference numeral 109 denotes roads; reference numeral 110 denotes a set point set by the point setting section 72; and reference numeral 111 denotes the present position of a moving body detected by the present position detecting section 73.

Figure 19:
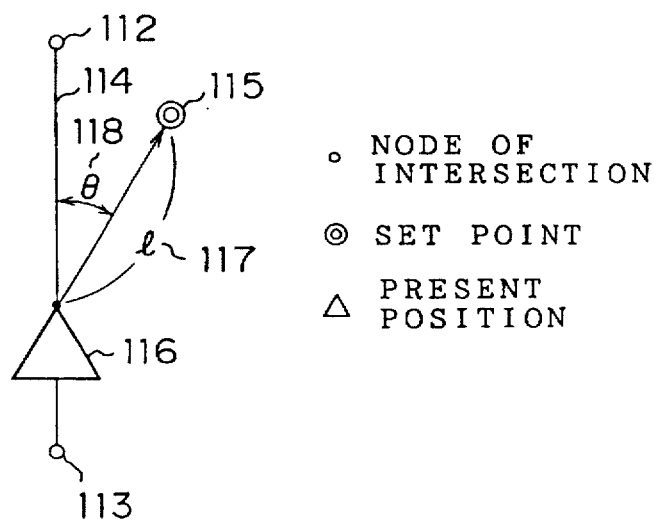
FIG. 19 is a diagram for illustrating a process by the in-car navigation apparatus shown in FIG. 14.

FIG. 19 is a diagram showing the detected examples of the distance and the direction from the present position of a moving body to the set position. In the figure, reference numeral 112 denotes a node of an intersection being ahead of the present position of a moving body; reference numeral 113 denotes a node of an intersection being behind the present position of the moving body; reference numeral 114 denotes a road which the present position exists on; reference numeral 115 denotes a set point set by the point setting section 72; reference numeral 116 denotes the present position of the moving body; reference numeral 117 denotes the distance on the straight line connecting the present position 116 and the set point 115; and reference numeral 118 denotes an angle θ of the set point 115 to the advancing direction of the moving body or an angle formed by the intersection 112 in front and the set point 115 to the present position 116.

FIG. 20 is a chart showing an example of correspondences among the angle 118 of a set point to the advancing direction of a moving body, classifications of voice waveforms and the contents of voice messages. In the figure, reference numeral 119 denotes an angle and a classification of a voice waveform correspondence table; reference numeral 120 denotes the ranges of the angles 118 of set points to the advancing direction of a moving body; and reference numeral 121 denotes classifications of voice waveforms corresponding to the ranges 120 of the angles 118. As shown in the chart, in the present embodiment, the control section 77 presumes that the set point 115 is ahead of the present position 116 if the angle θ formed by the intersection 112 in front and the set point 115 to the present position 116, shown in FIG. 19, is within the range of −45° through 45°. And, the control section 77 presumes that the set point 115 is on the right side to the present position 116 if the angle θ is larger than 45° and not larger than 180°, and that the set point 115 is on the left side to the present position 116 if the angle θ is larger than 180° and not larger than 315°.

Figure 21:
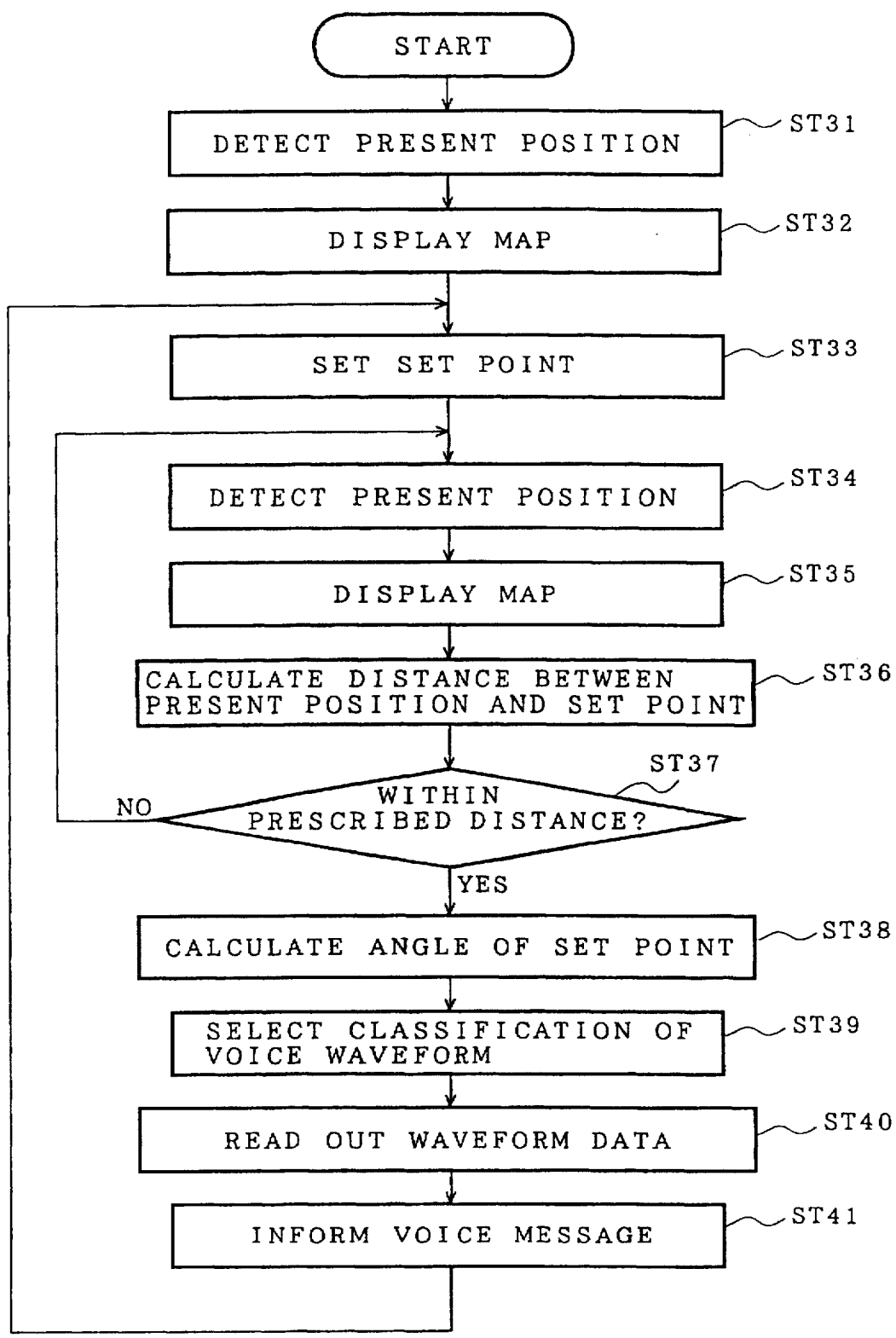
FIG. 21 is a flow chart showing the flow of the process used in the in-car navigation apparatus shown in FIG. 14.

FIG. 21 is a flow chart showing the flow of the process used in the in-car navigation apparatus according to the present embodiment. In the figure, reference characters ST31 through ST41 denote units of each process.

In operation, at first, at step ST31, the control section 77 detects the present position of the moving body on the GPS information or the like with the present position detecting section 73. At step ST32, the control section 77 reads out digitized map data 84 belonging to an arbitrary area around the present position from the map information memorizing section 71, and displays a map on the display section 76 in conformity with the intersection coordinates 91 and the coordinates of an interpolated point 99 of the road datum record 86, which coordinates 91 and 99 are respectively shown in FIG. 16(a) and FIG. 16(b). Next, at step ST33, a user appoints an arbitrary point on the displayed map by means of longitude and latitude, or the like, to set the point as a set point with the route setting section 72. After that, at step ST34, the present position detecting section 73 detects the present position of the moving body again in conformity with an instruction from the control section 77, and at step ST35, the control section 77 displays a map around the new present position on the display section 76.

Next, at step ST36, the control section 77 calculates the distance between the present position and the set point; and at step ST37, the control section 77 judges whether the calculated distance is within a prescribed distance (e.g. 1 km) set in advance or not. If the distance between the present position and the set point is within the prescribed distance, the control section 77 calculates the angle θ of the set point to the advancing direction of the moving body at step ST38. On the other hand, if the distance between the present position and the set position is judged not to be within the prescribed distance at step ST37, the control section 77 returns to step ST34 to repeat the processes from step ST34 through step ST36 until the distance becomes shorter than the prescribed distance.

The calculation of the angle θ at step ST38 is executed by the use of the detected results of the distance and the direction of the set point 115 to the present position 116 of the moving body shown in FIG. 19. The angle θ formed by the line segment connecting the present position 116 with the set point 115 to the reference line segment connecting the present position 116 with the intersection 112 in front is calculated on the longitude and latitude coordinates of the present position 116, the longitude and latitude coordinates of the intersection 112 being ahead of the present position 116, and the longitude and latitude coordinates of the set point 115. At step ST39, the control section 7 retrieves the classification of a voice waveform 121 corresponding to the calculated angle θ from the angle and a classification of a voice waveform correspondence table 119 shown in FIG. 20. Next, at step ST40, the control section 7 retrieves the voice waveform data managing information 101 of the voice waveform datum group 87 shown in FIG. 17(a) to obtain a voice waveform data managing record 103 having a classification of a voice waveform 104 corresponding to the classification of a voice waveform 121 obtained at step ST39. Then, the control section 77 obtains a pointer 105 to the corresponding digitized waveform datum 106 shown in FIG. 17(c). Besides, at the step ST40, the control section 77 reads out a plurality of digitized waveform data 106 of the minimum unit, shown in FIG. 17(c), corresponding to the pointer 105 from the digitized waveform datum group 102. Then, at step ST41, the control section 77 informs the messages with voice after converting the read out plurality of digitized waveform data 106 into analogue waveforms. And the control section 77 returns to step ST33 for setting a new set point, and repeats the above processes of step ST34 through step ST41.

As described above, the in-car navigation apparatus according to the present embodiment is constructed to inform with voice the direction of a set point as well as the fact that the moving body has come close to the set point when it has approached to the point. Consequently, the driver of the moving body can easily find the set point during driving.

EMBODIMENT 3

Figure 22:
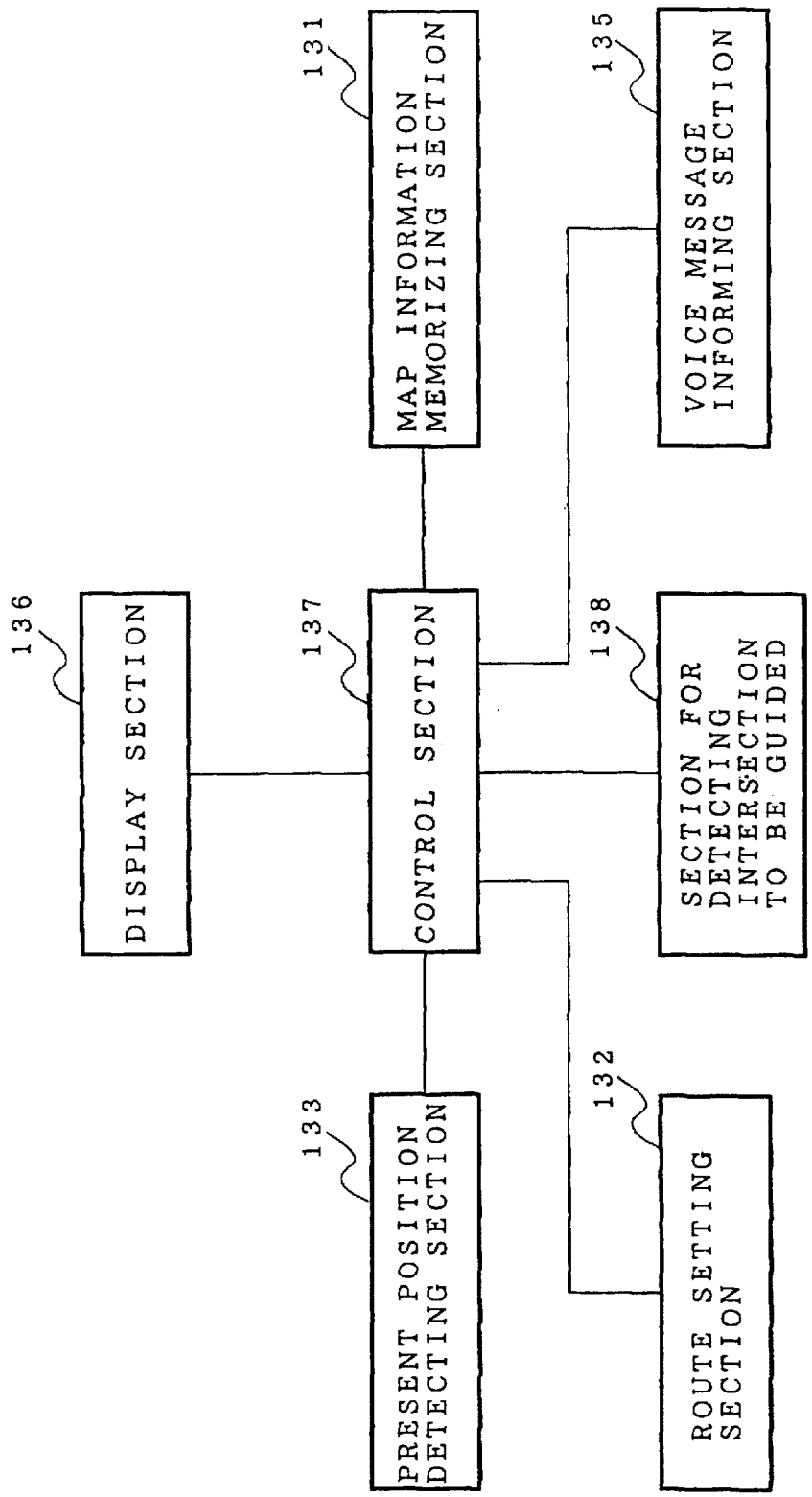
FIG. 22 is a block diagram showing the construction of the in-car navigation apparatus according to a further embodiment of the present invention.

FIG. 22 is a block diagram schematically showing the construction of the in-car navigation apparatus according to further embodiment of the present invention. In the figure, reference numeral 131 denotes a map information memorizing section for storing digitized map data: reference numeral 132 denotes a route setting section for setting a drive route between two points on a map; reference numeral 133 denotes a present position detecting section for detecting a present position and an advancing direction of a moving body on the GPS information or the like; reference numeral 135 denotes a voice message informing section for reading out a voice waveform datum to inform a voice message after executing the digital-to-analogue conversion of the datum; reference numeral 136 denotes a display section for displaying a map, a present position and a drive route; reference numeral 138 denotes a section for detecting an intersection to be guided (or a means for detecting an intersection to be guided); and reference numeral 137 denotes a control section for calculating a distance between a present position detected by the present position detecting section 133 and an inter section to be guided detected by the section 138, and for reading out the voice waveform information of different message patterns from the map information memorizing section 131 on whether the calculated distance exceeds a prescribed distance set in advance or not to output an instruction to inform a voice message corresponding to the voice message Pattern to the voice message informing section 135.

Figure 23:
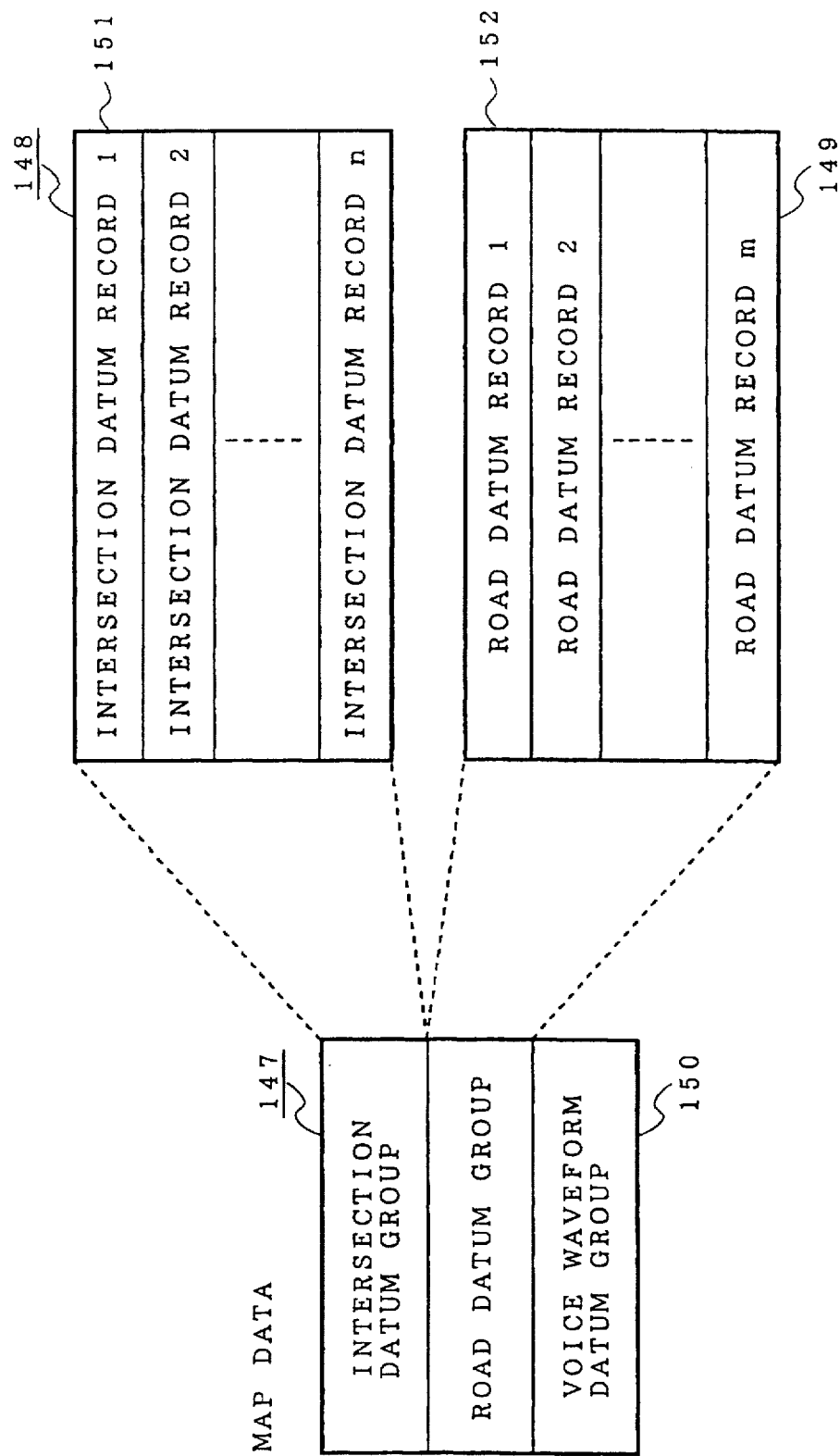
FIG. 23 is a chart showing the construction of the digitized map data of the in-car navigation apparatus shown in FIG. 22.

FIG. 23 through FIG. 25(c) are charts showing the construction of digitized map data memorized in the map information memorizing section 131. In FIG. 23, reference numeral 147 denotes the whole digitized map data; reference numeral 148 denotes an intersection datum group being a first composing element of the digitized map data 147, and being a set of data concerning intersections; reference numeral 149 denotes a road datum group being a second composing element, and being a set of data concerning roads; reference numeral 150 denotes a voice waveform datum group being a third composing element, and being a set of data concerning voice waveforms; reference numeral 151 denotes an intersection datum record constituted of various data concerning one intersection; and reference numeral 152 denotes a road datum record constituted of various data concerning one road. In FIG. 24(a) and FIG. 24(b), reference numeral 153 denotes an intersection number indicating an I.D. number given to an intersection uniquely; reference numeral 154 denotes an intersection coordinates indicating the position of an intersection on a map by longitude and latitude, or the like; reference numeral 155 denotes a number of connecting roads representing the number of roads connected to an intersection; and reference numeral 156 denotes road numbers of the connected roads.

Reference numeral 157 denotes a road number indicating an I.D. number given to a road uniquely; reference numeral 158 denotes an intersection number on a start point side indicating an intersection connected to the start point side of a road; reference numeral 159 denotes an intersection number on a terminal point side indicating an intersection connected to the terminal point side of a road; reference numeral 160 denotes a number of interpolated points being bent points existing between the start point and the terminal point of a road; reference numeral 162 denotes coordinates of an interpolated point indicating a position of an interpolated point by longitude and latitude, or the like; reference numeral 161 denotes coordinates on a start point side indicating the position of the start point of a road by longitude and latitude, or the like; and reference numeral 163 denotes coordinates on a terminal point side indicating the position of the terminal point of a road by longitude and latitude, or the like.

Figure 25A:
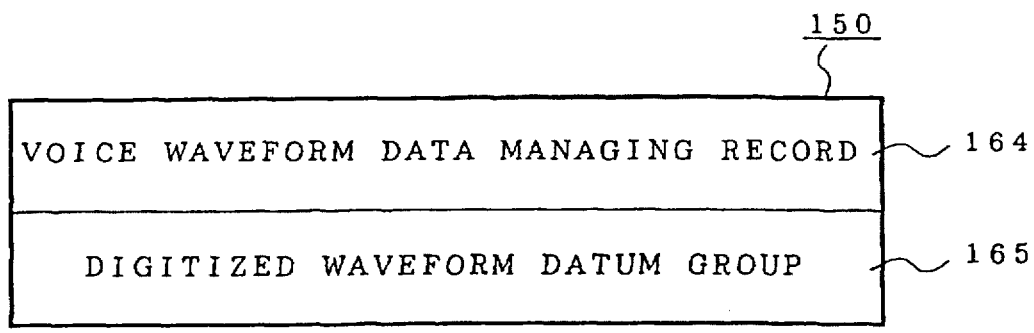
FIG. 25(a), FIG. 25(b) and FIG. 25(c) are charts respectively showing the construction of the voice waveform data, the construction of the voice waveform data managing record and the construction of the digitized waveform data of the in-car navigation apparatus shown in FIG. 22, the latter two of which constitute the voice waveform data.
Figure 25B:
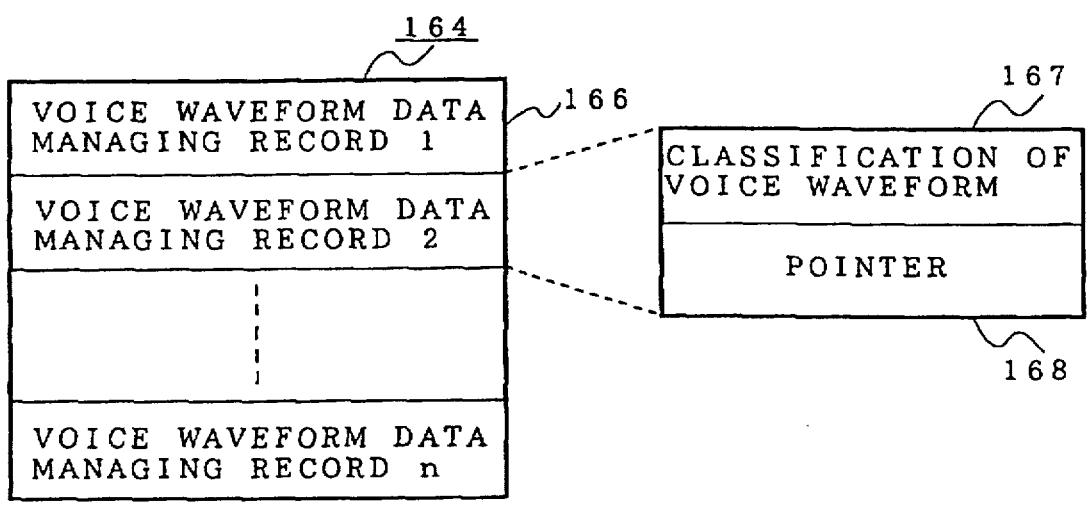
Figure 25C:
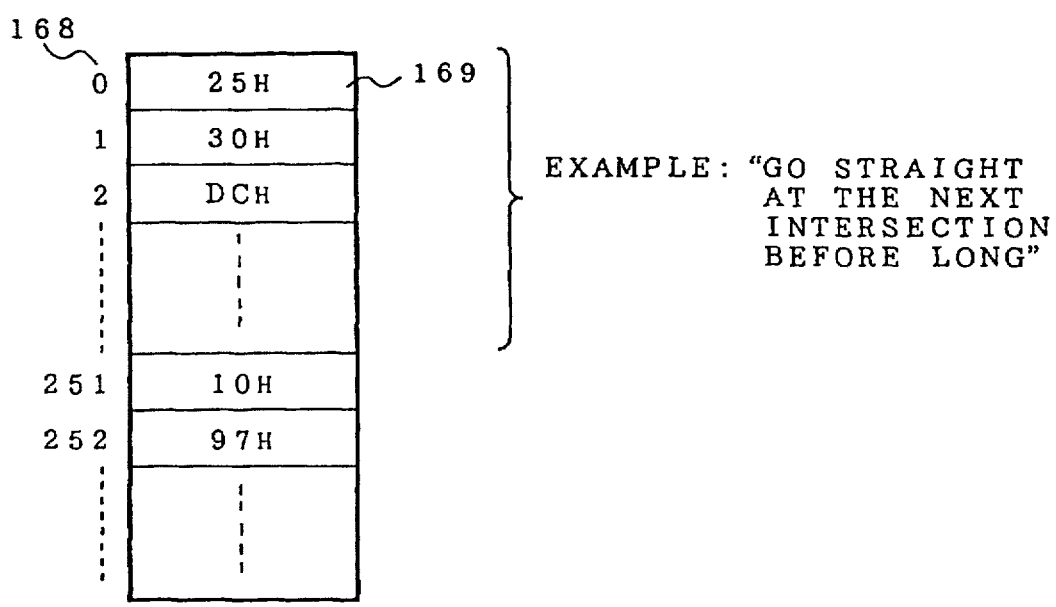

In FIG. 25(a), FIG. 25(b) and FIG. 25(c), reference numeral 164 denotes voice waveform data managing information, one of the composing elements of the voice waveform datum group 150, for storing managing information concerning the contents of voice waveform data; reference numeral 165 denotes a digitized waveform datum group being the other composing element of the voice waveform datum group 150, and being a set of digitized waveform data; reference numeral 166 denotes a voice waveform data managing record for storing the managing information of each unit of voice messages; reference numeral 167 denotes a classification of a voice waveform indicating the classification of a voice message; reference numeral 168 denotes a pointer indicating the position of a corresponding voice waveform datum by the amount of an offset from the front position of the voice waveform datum group 150; and reference numeral 169 denotes the minimum unit of a digitized waveform datum constituting the digitized waveform datum group 165 stored in the map information memorizing section 131 after being converted from an analogue voice waveform to a digitized waveform datum.

FIG. 26 is a table showing correspondences among distances from the present positions of a moving body detected by the present position detecting section 133 to intersections to be guided detected by the section for detecting an intersection to be guided 138, advancing directions from intersections to be guided and the classifications of voice waveforms. In the figure, reference numeral 170 denotes the whole classification of a voice waveform correspondence table; reference numeral 171 denotes the ranges of distances up to intersections to be guided; reference numeral 172 denotes the flowing out directions of drive routes from intersections to be guided; and reference numeral 173 denotes classifications of voice waveforms corresponding to the ranges of distances 171 and the flowing out directions 172. As shown in the table, in the present embodiment, the classifications of voice waveforms 173 and the contents of voice messages are previously determined in accordance with combinations of distances from present positions up to intersections to be guided and advancing directions from intersections to be guided, for example, the combination of the distance shorter than 0.7 km and the advancing direction to turn right, the combination of the distance being 10 km and the advancing direction to go straight, and so forth.

Figure 27:
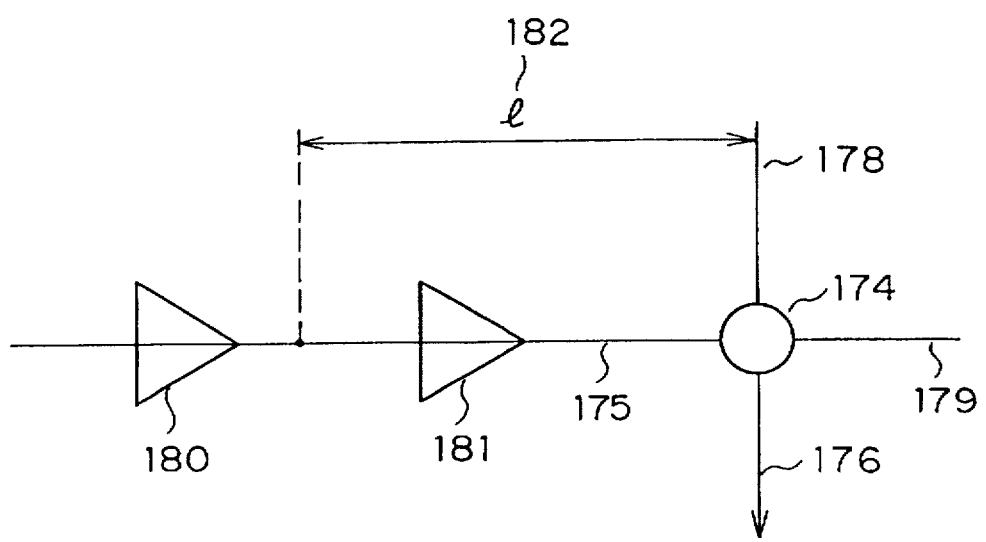
FIG. 27 is a diagram showing a portion of an example of a drive route of the in-car navigation apparatus shown in FIG. 22.

FIG. 27 is a diagram showing a portion of an example of a drive route set by the route setting section 132. In the figure, reference numeral 174 denotes an intersection to be guided, where a voice message is informed, detected by the section for detecting an intersection to be guided 138; reference numerals 175 and 176 denote roads being drive routes; reference numerals 178 and 179 denote roads other than route roads connected to the intersection 174; reference numerals 180 and 181 denote present positions indicating the positions of a moving body moving on a drive route; and reference 182 denotes a prescribed distance, set in advance, from the intersection to be guided 174.

Figure 28:
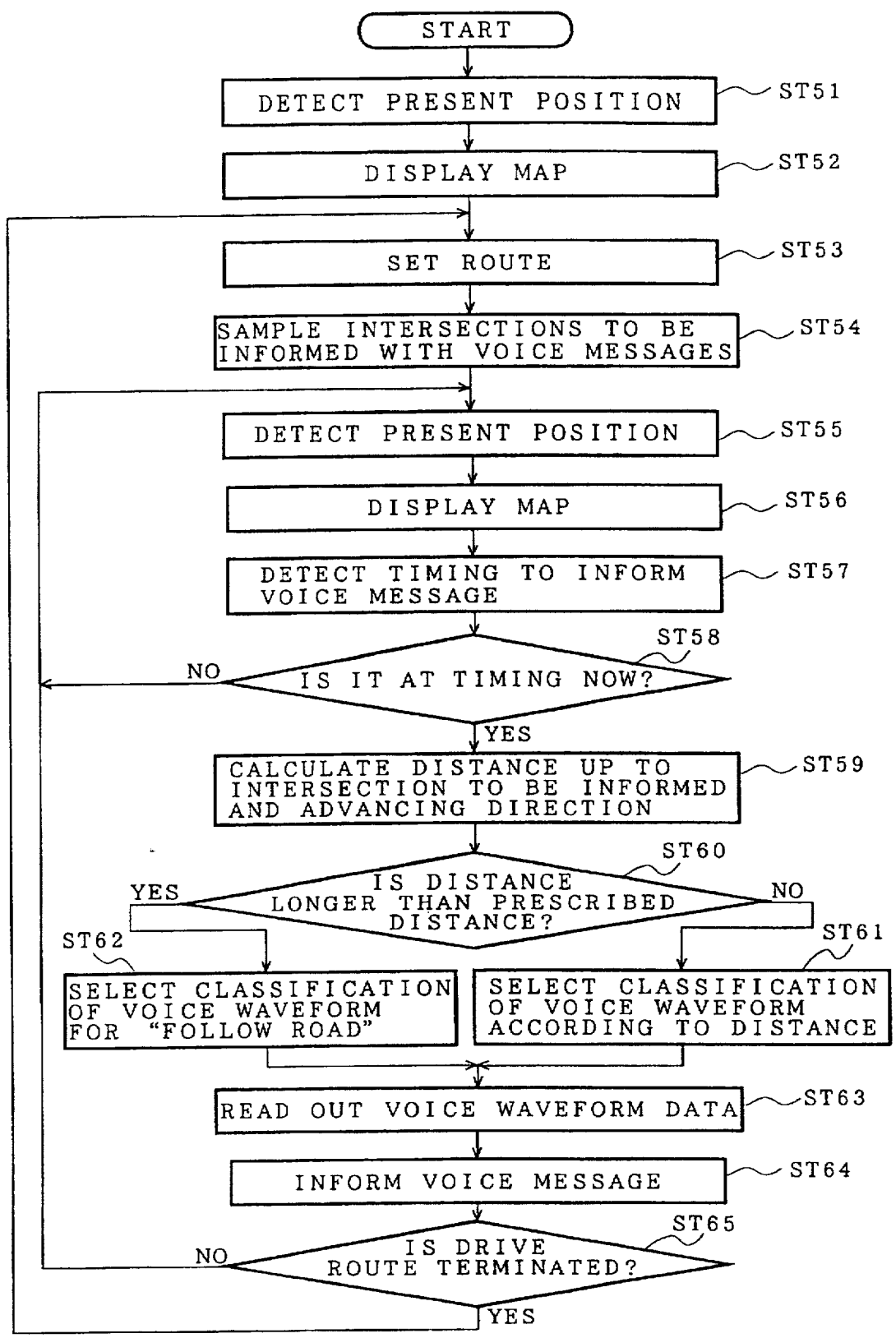
FIG. 28 is a flow chart showing the flow of the process used in the in-car navigation apparatus shown in FIG. 22.

FIG. 28 is a flow chart showing the flow of the processes used in the in-car navigation apparatus according to the present embodiment. In the figure, reference characters ST51 through ST65 denote units of each process.

In operation, at first, at step ST51, the control section 137 detects the present position of the moving body on the GPS information or the like with the present position detecting section 133. At step ST52, the control section 137 reads out digitized map data 147 belonging to an arbitrary area around the present position from the map information memorizing section 131, and displays a map on the display section 136 in conformity with the intersection coordinates 154 and the coordinates of an interpolated point 162 of the road datum record 152, which coordinates 154 and 162 are respectively shown in FIG. 24(a) and FIG. 24(b). Next, at step ST53, the route setting section 132 sets two points on the map by means of longitude and latitude, or the like, to set a drive route between the two points in conformity with Dijkstra Method, which is a general search algorithm on a network, or the like.

At step ST54, the section for detecting an intersection to be guided 138 samples intersections having, for example, 3 roads or more connected to the intersection out of the intersections existing on the set drive route and the two points set by the route setting section 132 as points where voice messages are informed. In succession, at step ST55, the control section 137 detects the present position of the moving body again with present position detecting section 133, and at step ST56, the control section 137 again displays a map on the display section 136 on the new present position. Next, at step ST57, the control section 137 detects a timing of informing a voice message, and at step ST58, judges whether it is the timing of informing a voice message or not. The judgement of the timing for informing a voice message is executed by, for example, calculating a distance between the present position and an intersection to be guided with voice by the use of their coordinates, and by judging whether the calculated distance is within several prescribed distances arbitrarily set in advance or not. The judgement of the timing may be a result of a system manipulation by a driver. If the control section 137 judges that it is not the timing to inform a voice message at step ST58, the control section 137 returns to step ST56 and repeats the processes of step ST55 through step ST58 until it becomes the timing.

Next, at step ST59, the control section 137 calculates the distance between the present position and an intersection to be guided being ahead of the present position, and further determines whether the drive route from the intersection to be guided is to go straight or to turn right or left; and at step ST60, the control section 137 judges whether the calculated distance is within a prescribed distance or not. If the distance between the present position and the intersection to be guided being ahead of the present position is within the prescribed distance, the control section 137 selects the distance up to the intersection to be guided and the classification of a voice waveform 173 corresponding to the advancing direction of the moving body out of the classification of a voice waveform correspondence table 170 at step ST61; if the distance exceeds the range of the prescribed distance, the control section 137 selects the classification of a waveform 173 corresponding to following the road at step ST62. Next, at step ST63, the control section 137 retrieves a pointer 168 to a corresponding voice waveform datum from the voice waveform datum managing information 164 of the voice waveform datum group 150, shown in FIG. 25(b), memorized in the map information memorizing section 131 for reading out digitized waveform data 169 being a corresponding plurality of basic units among the digitized waveform datum group 165. Then, at step ST64, the control section 137 informs the messages with voice after converting the read out plurality of digitized waveform data 169 into analogue waveforms. At last, at step ST65, the control section 137 judges whether the drive route has ended or not. If the drive route has not ended yet, the control section 137 returns to step ST55 for repeating the processes of steps after step ST55 with regard to the next intersection to be guided.

As described above, the in-car navigation apparatus according to the present embodiment is constructed to inform a voice message instructing to keep following the driving road when a moving body is far away from an intersection to be a starting point to change the advancing direction thereof to the right or the left etc., and to inform a voice message of a distance to an intersection and an advancing direction when the moving body comes within a prescribed distance from the intersection. Consequently, a driver can concentrate on driving without hearing the information unnecessary for the present, and safer driving is enabled.

EMBODIMENT 4

Figure 29:
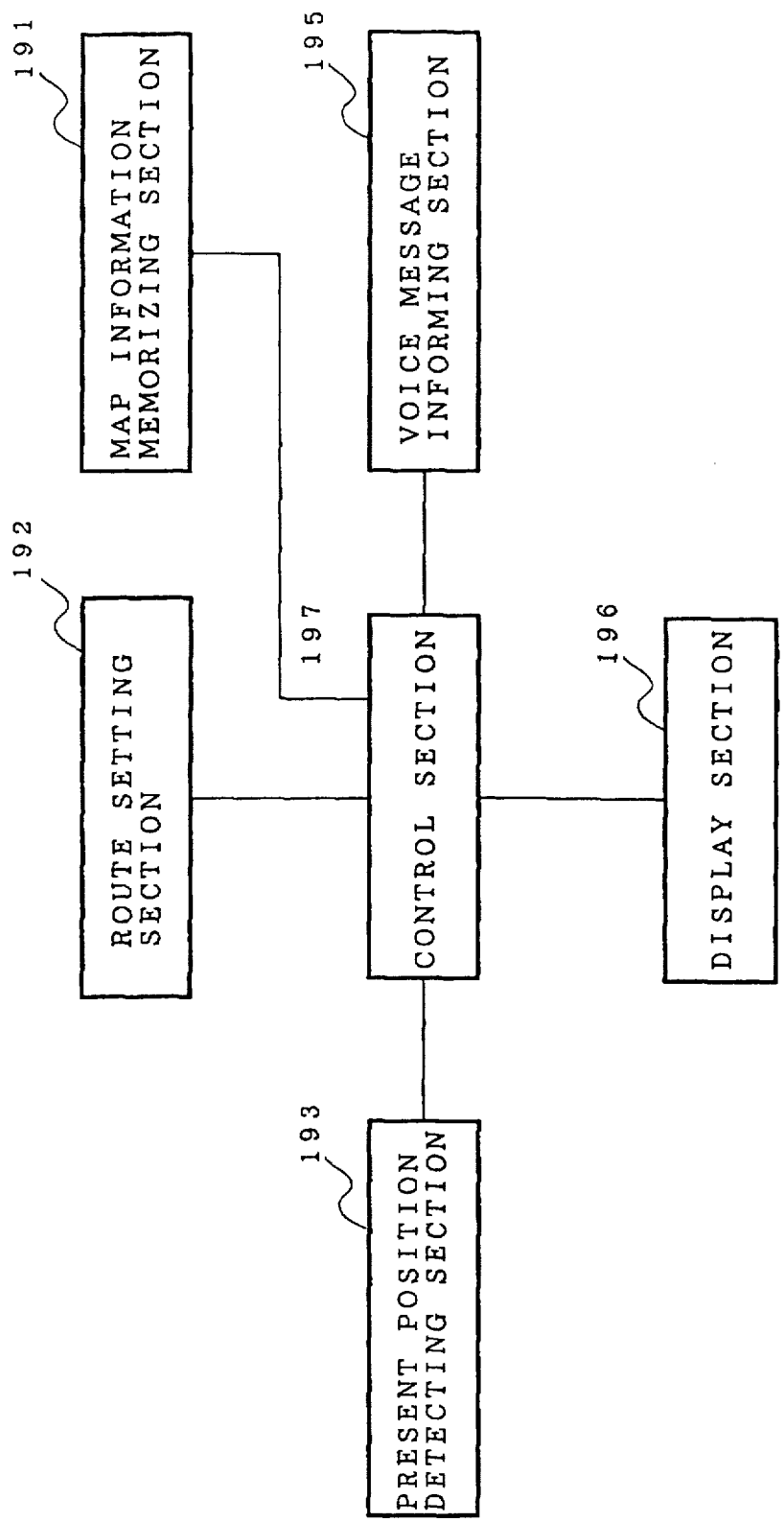
FIG. 29 is a block diagram showing the construction of the in-car navigation apparatus according to a still further embodiment of the present invention.

FIG. 29 is a block diagram schematically showing the construction of the in-car navigation apparatus according to still further embodiment of the present invention. In the figure, reference numeral 191 denotes a map information memorizing section for storing digitized map data; reference numeral 192 denotes a route setting section for setting a drive route between two points on a map; reference numeral 193 denotes a present position detecting section for detecting a present position and an advancing direction of a moving body on the GPS information or the like; reference numeral 195 denotes a voice message informing section for reading out a voice waveform datum to inform a voice message after executing the digital-to-analogue conversion of the datum; reference numeral 196 denotes a display section for displaying a map, a present position and a drive route; and reference numeral 197 denotes a control section for outputting an instruction to the voice message informing section 195 to inform a voice message corresponding to a classification of a voice waveform indicating the effect that an intersection being ahead of a present position detected by the present position detecting section 193 is one to turn right or left through a service road when the case comes true.

FIG. 30 through FIG. 32(c) are charts showing the construction of digitized map data memorized in the map information memorizing section 191. In FIG. 30, reference numeral 206 denotes the whole digitized map data; reference numeral 207 denotes an intersection datum group being a first composing element of the digitized map data 206, and being a set of data concerning intersections; reference numeral 208 denotes a road datum group being a second composing element, and being a set of data concerning roads; reference numeral 209 denotes a voice waveform datum group being a third composing element, and being a set of data concerning voice waveforms; reference numeral 210 denotes an intersection datum record constituted of various data concerning one intersection; and reference numeral 211 denotes a road datum record constituted of various data concerning one road. In FIG. 31(a), reference numeral 212 denotes an intersection number indicating an I.D. number given to an intersection uniquely; reference numeral 213 denotes an intersection coordinates indicating the position of an intersection on a map by longitude and latitude, or the like; reference numeral 214 denotes a two-level crossing intersection flag indicating whether an intersection is a grade crossing ordinary intersection or a two-level crossing intersection connected with service roads; reference numeral 215 denotes a number of connecting roads representing the number of roads connected to an intersection; reference numeral 216 denotes road numbers of the connected roads; and reference numeral 217 denotes a distance of a service road indicating a distance from an intersection up to a junction of a service road and a connecting road if the intersection is a two-level crossing intersection. In FIG. 31(b), reference numeral 218 denotes a road number indicating an I.D. number given to a road uniquely; reference numeral 219 denotes an intersection number on a start point side indicating an intersection connected to the start point side of a road; reference numeral 220 denotes an intersection number on a terminal point side indicating an intersection connected to the terminal point side of a road; reference numeral 221 denotes a number of interpolated points being bent points existing between the start point and the terminal point of a road; reference numeral 223 denotes coordinates of an interpolated point indicating a position of an interpolated point by longitude and latitude, or the like; reference numeral 222 denotes coordinates on a start point side indicating the position of the start point of a road by longitude and latitude, or the like; and reference numeral 224 denotes coordinates on a terminal point side indicating the position of the terminal point of a road by longitude and latitude, or the like.

Figure 32A:
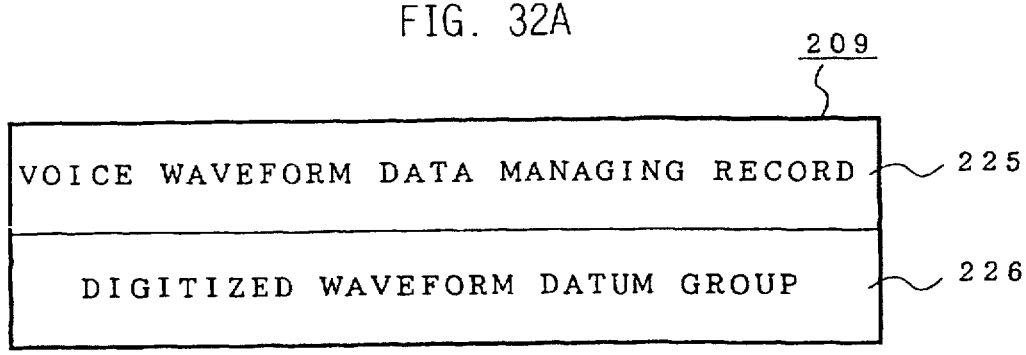
FIG. 32(a), FIG. 32(b) and FIG. 32(c) are charts respectively showing the construction of the voice waveform data, the construction of the voice waveform data managing record and the construction of the digitized waveform data of the in-car navigation apparatus shown in FIG. 29, the latter two of which constitute the voice waveform data.
Figure 32B:
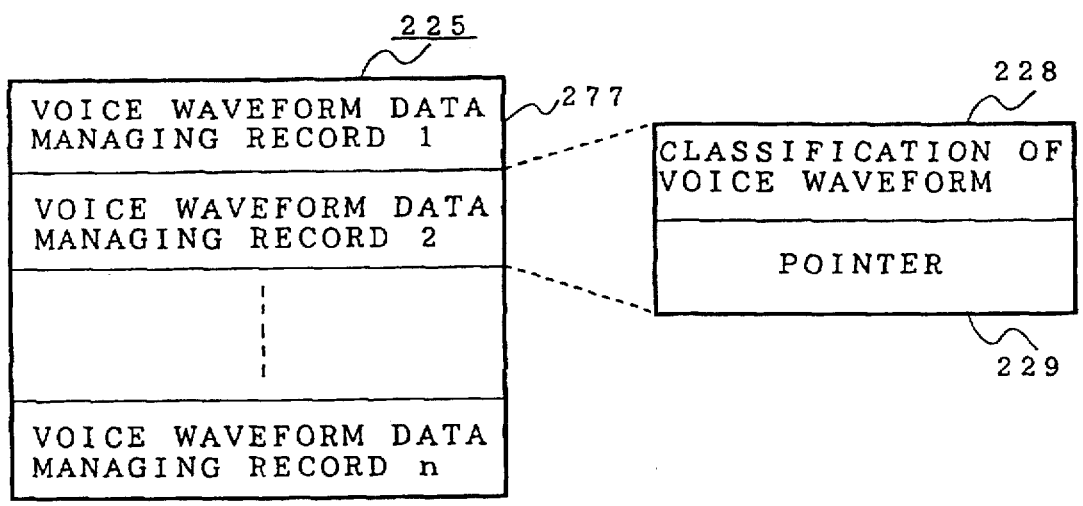
Figure 32C:
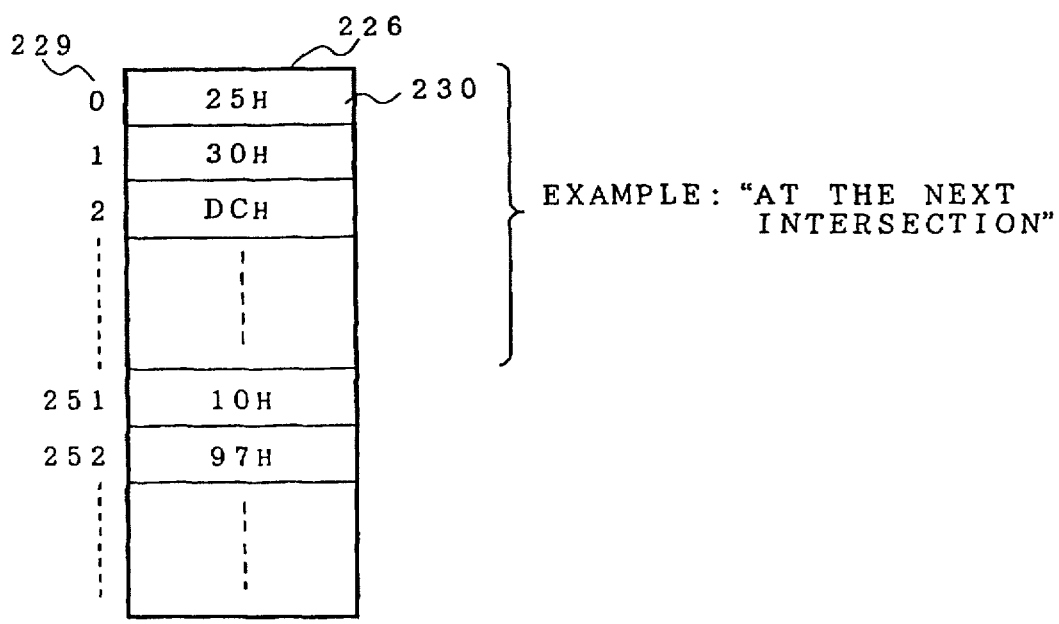

In FIG. 32(a), FIG. 32(b) and FIG. 32(c), reference numeral 225 denotes voice waveform data managing information, one of the composing elements of the voice waveform datum group 209, for storing managing information concerning the contents of voice waveform data; reference numeral 226 denotes a digitized waveform datum group being the other composing element of the voice waveform datum group 209, and being a set of digitized waveform data; reference numeral 227 denotes a voice waveform data managing record for storing the managing information of each unit of voice messages; reference numeral 228 denotes a classification of a voice waveform indicating the classification of a voice message; reference numeral 229 denotes a pointer indicating the position of a corresponding voice waveform datum by the amount of an offset from the front position of the voice waveform datum group 209; and reference numeral 230 denotes the minimum unit of a digitized waveform datum constituting the digitized waveform datum group 226 stored in the map information memorizing section 191 after being converted from an analogue voice waveform to a digitized waveform datum.

FIG. 33 is an advancing direction and classification of a voice waveform correspondence table showing correspondences between advancing directions of a drive route from an intersection being ahead of a present position and one or a plurality of classifications of voice waveforms. In the figure, reference numeral 231 denotes the whole of an advancing direction and classification of a voice waveform correspondence table; reference numeral 232 denotes advancing directions; and reference numeral 233 denotes classification trains of voice waveforms.

FIG. 34 is a table showing an example of the contents represented by the classifications of voice waveforms shown in FIG. 33. In the figure, numerals 1 through 5 in the column of the number of a classification of a voice waveform correspond to the classification of a voice waveform 1 through the classification of a voice waveform 5 respectively. Therefore, if the advancing direction 232 in the advancing direction and classification of a voice waveform correspondence table 231 is "turn right", the content of a corresponding voice is "turn right at the next intersection."

Figure 35:
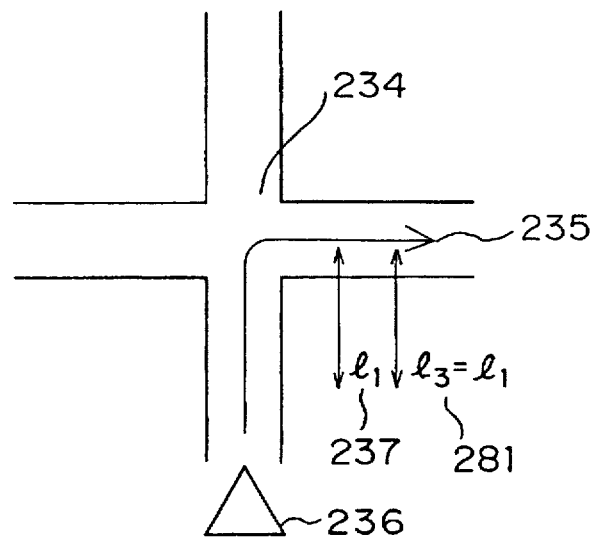
FIG. 35 is a diagram for illustrating the process at an ordinary intersection in the in-car navigation apparatus shown in FIG. 29.
Figure 36:
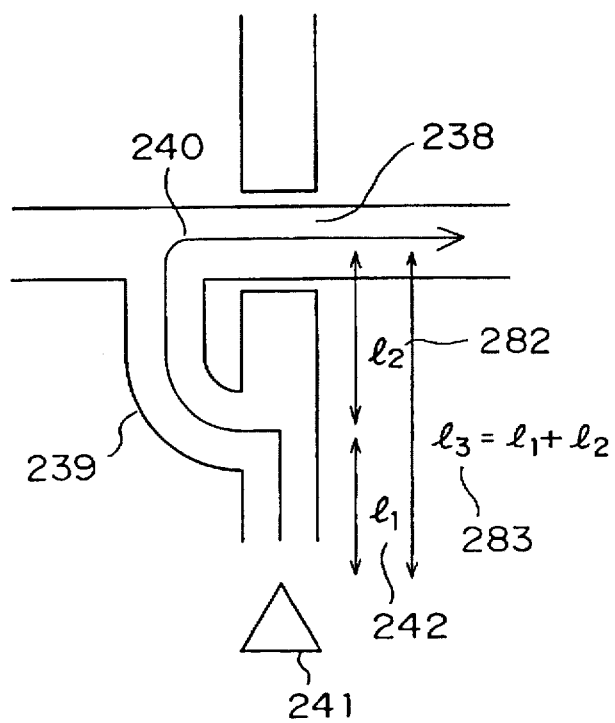
FIG. 36 is a diagram for illustrating the process at a two-level crossing intersection in the in-car navigation apparatus shown in FIG. 29.

FIG. 35 and FIG. 36 are diagrams respectively showing an example of intersections. FIG. 35 illustrates an ordinary intersection; FIG. 36 illustrates a two-level crossing intersection. In FIG. 35, reference numeral 234 denotes an intersection; reference numeral 235 denotes a drive route turning right; reference numeral 236 denotes a Present Position; reference numeral 237 denotes a prescribed distance 11; and reference numeral 281 denotes a timing distance 13. In FIG. 36, reference numeral 238 denotes a two-level crossing intersection; reference numeral 239 denotes a service road; reference numeral 240 denotes a drive road turning right through the service road 239; reference numeral 241 denotes a present position; reference numeral 242 denotes a prescribed distance; reference numeral 282 denotes the distance of the service road 239; and reference numeral 283 denotes a timing distance.

Figure 37:
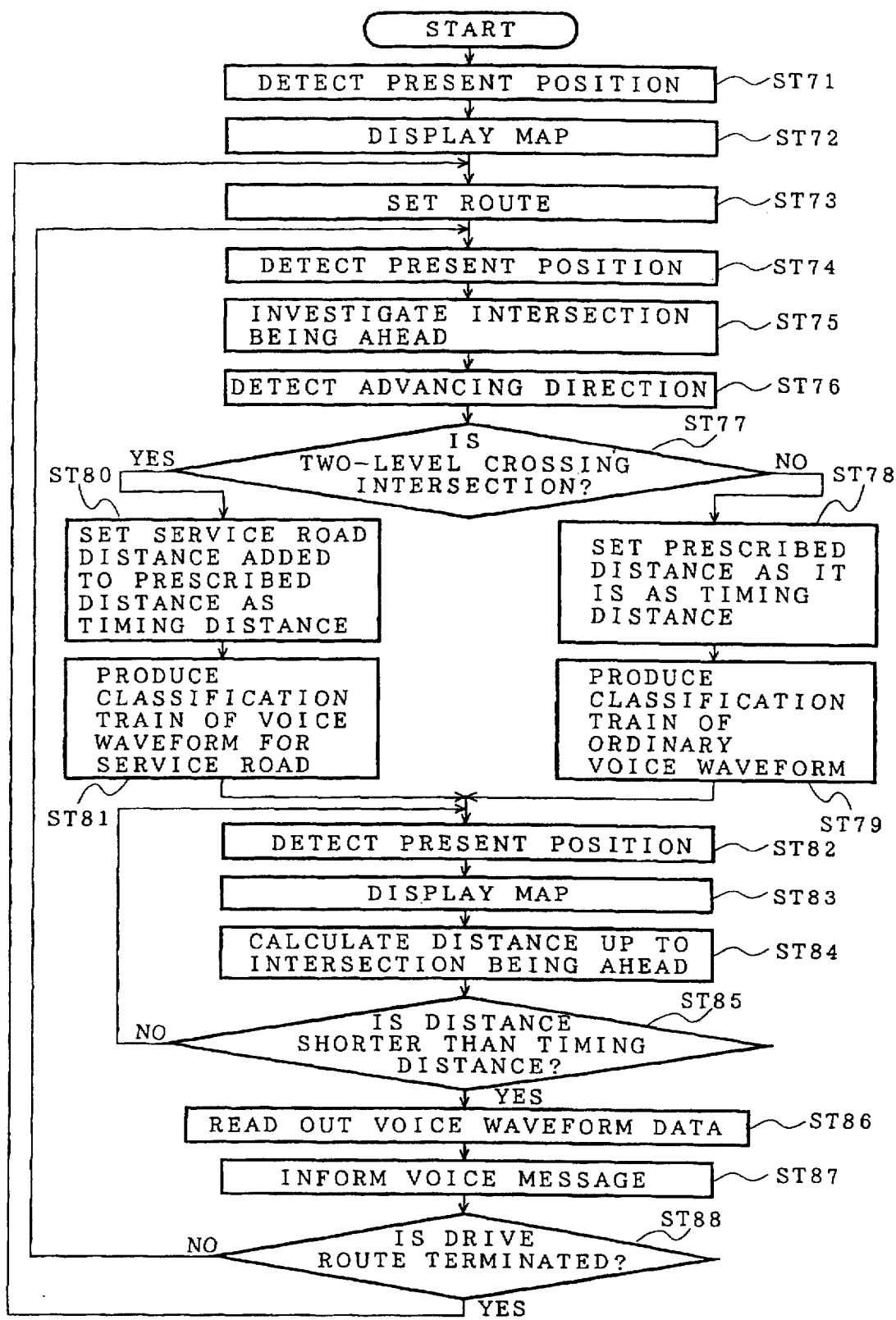
FIG. 37 is a flow chart showing the flow of the process used in the in-car navigation apparatus shown in FIG. 29.

FIG. 37 is a flow chart showing the flow of the processes used in the in-car navigation apparatus according to the present embodiment. In the figure, reference characters ST71 through ST87 denote units of each process.

In operation, at first, at step ST71, the control section 197 detects the present position of the moving body on the GPS information or the like with the present position detecting section 193. At step ST72, the control section 197 reads out digitized map data 206 belonging to an arbitrary area around the present position from the map information memorizing section 191, and displays a map on the display section 196 in conformity with the intersection coordinates 213 and the coordinates of an interpolated point 223 of the road datum record 211, which coordinates 213 and 223 are respectively shown in FIG. 31(a) and FIG. 31(b). Next, at step ST73, the route setting section 192 sets two points on the map by means of longitude and latitude, or the like, to set a drive route between the two points in conformity with Dijkstra Method, which is a general search algorithm on a network, or the like. Then, at step ST74, the control section 197 detects a new present position of the moving body again with present position detecting section 193. Next, at step ST75, the control section 197 detects an intersection being ahead of the present position and on the drive route to retrieve a corresponding intersection datum from the map information memorizing section 191. Beside, at step ST76, the control section 197 detects the advancing direction from an intersection in front in the form of going straight, turning right or turning left. This process is executed by calculating the relative angle of a road flowing out of the intersection to a road flowing in the intersection.

At step ST77, the control section 197 judges whether the intersection in front is a two-level crossing intersection or not by examining the two-level crossing intersection flag 214, shown in FIG. 31(a), among the intersection data obtained by the process at step ST75. If the result of the examination does not show that the intersection is a two-level crossing intersection, the control section 197 makes a prescribed distance (e.g. 1 km) set in advance a timing distance, a timing of informing a voice message at step ST78, and, at step ST79, the control section 197 retrieves a corresponding classification train of voice waveforms 233 from the advancing direction and classification of a voice waveform correspondence table 231 shown in FIG. 33 on the basis of the advancing direction detected at step ST76. On the other hand, if the result of the examination shows that the intersection is a two-level crossing intersection, the control section 197 obtains the service road distance 217, shown in FIG. 31(a), corresponding to the road flowing in the intersection on the basis of the intersection data obtained at step ST75 to make the service road distance 217 added to a prescribed distance the timing distance at step ST80.

The above processes will now be described with regard to the examples of intersections shown in FIG. 35 and FIG. 36. If the intersection in front is an ordinary intersection shown in FIG. 35, the prescribed distance 237 is set to be the timing distance 281 as it is. If the intersection in front is a two-level crossing intersection shown in FIG. 36, the prescribed distance 242 added to the serving road distance 282 is set to be the timing distance 283.

After that, at step ST81, the control section 197 obtains the classification train of voice waveforms 233 corresponding to the advancing direction detected at step ST76 by means of a process identical to that of the step ST79, and further Produces a classification train of voice waveforms by adding a classification train of voice waveforms representing the meaning of passing through a service road to the obtained classification train of voice waveforms 233. Next, at step ST82, the control section 197 again detects the present position of the moving body by means of the present position detecting section 193, and displays a map around the present position at step ST83. Then, at step ST84, the control section 196 calculates the distance between the present position detected at step ST82 and the intersection in front, and judges whether the present position is within the timing distance calculated at step ST78 or ST80 or not. If the result of the judgement shows that the present position is within the timing distance, the control section 197 retrieves the corresponding plurality of basic units of digitized waveform data 230 from the voice waveform data managing information 225 of the voice waveform datum group 209 memorized in the map information memorizing section 191 to read out of the digitized waveform datum group 226 one by one. And, at step ST87, the control section 197 informs the messages with voice after converting the read out plurality of digitized waveform data 230 into analogue waveforms. At last, at step ST88, the control section 197 judges whether the drive route has ended or not. If the drive route has not ended yet, the control section 197 returns to step ST74 for repeating the processes of steps after step ST74 with regard to the next intersection.

As described above, the in-car navigation apparatus according to the present embodiment is constructed to inform a voice message at a timing earlier than the ordinary timing to an intersection where a moving body is to turn right or left through a service road. Consequently, a driver can prepare to branch off to a service road earlier for enabling safer driving.

EMBODIMENT 5

Figure 38:
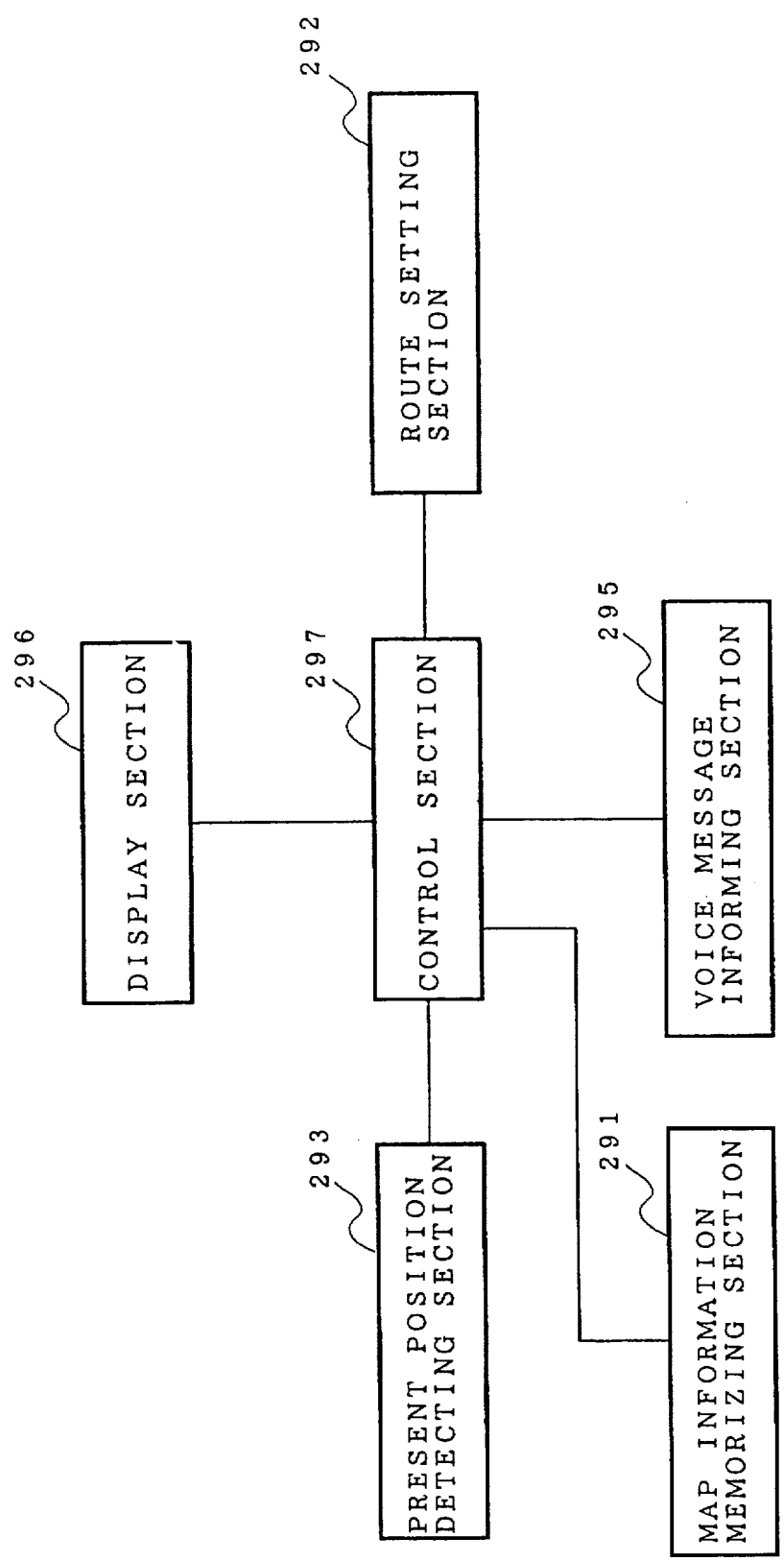
FIG. 38 is a block diagram showing the construction of the in-car navigation apparatus according to a still further embodiment of the present invention.

FIG. 38 is a block diagram schematically showing the construction of the in-car navigation apparatus according to still further embodiment of the present invention. In the figure, reference numeral 291 denotes a map information memorizing section for storing digitized map data; reference numeral 292 denotes a route setting section for setting a drive route between two points on a map; reference numeral 293 denotes a present position detecting section for detecting a present position and an advancing direction of a moving body on the basis of GPS information or the like; reference numeral 295 denotes a voice message informing section for reading out a voice waveform datum to inform a voice message after executing the digital-to-analogue conversion of the datum; reference numeral 296 denotes a display section for displaying a map, a present position and a drive route; and reference numeral 297 denotes a control section for outputting an instruction to the voice message informing section 295 to inform only a caution sound if the advancing direction of a drive route from the intersection being ahead of the present position detected by the present position detecting section 293.

Figure 39:
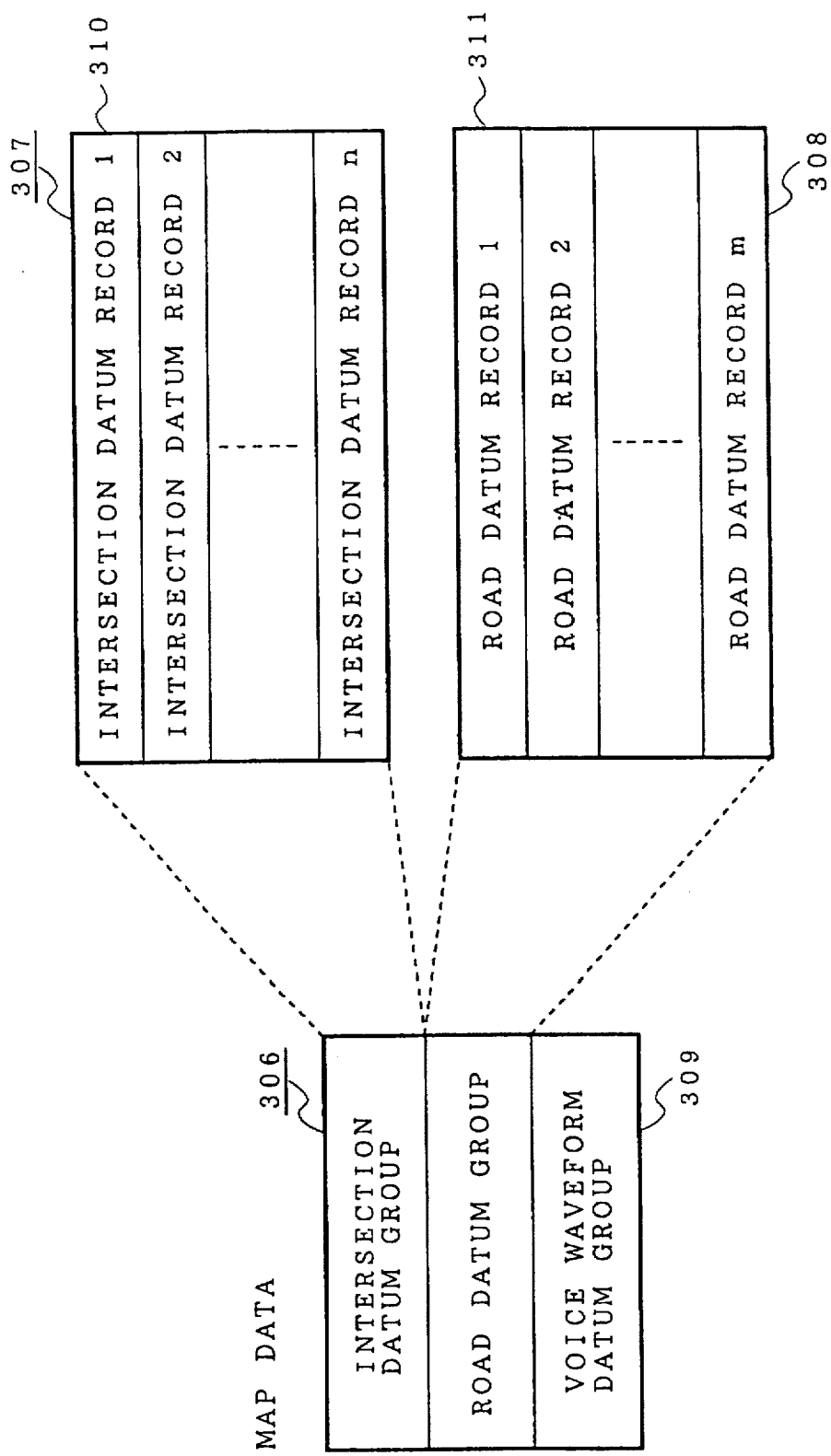
FIG. 39 is a chart showing the construction of the digitized map data of the in-car navigation apparatus shown in FIG. 38.

FIG. 39 through FIG. 41(c) are charts showing the construction of digitized map data memorized in the map information memorizing section 291. In FIG. 39, reference numeral 306 denotes the whole digitized map data; reference numeral 307 denotes an intersection datum group being a first composing element of the digitized map data 306, and being a set of data concerning intersections; reference numeral 308 denotes a road datum group being a second composing element, and being a set of data concerning roads; reference numeral 309 denotes a voice waveform datum group being a third composing element, and being a set of data concerning voice waveforms; reference numeral 310 denotes an intersection datum record constituted of various data concerning one intersection; and reference numeral 311 denotes a road datum record constituted of various data concerning one road. In FIG. 40(a) and FIG. 40(b), reference numeral 312 denotes an intersection number indicating an I.D. number given to an intersection uniquely; reference numeral 313 denotes an intersection coordinates indicating the position of an intersection on a map by longitude and latitude, or the like; reference numeral 314 denotes the number of connecting roads indicating a number of roads connected to an intersection; reference numeral 315 denotes road numbers of the connected roads; reference numeral 316 denotes a road number indicating an I.D. number given to a road uniquely; reference numeral 317 denotes an intersection number on a start point side indicating an intersection connected to the start point side of a road; reference numeral 318 denotes an intersection number on a terminal point side indicating an intersection connected to the terminal point side of a road; reference numeral 319 denotes a number of interpolated points being bent points existing between the start point and the terminal point of a road; reference numeral 321 denotes coordinates of an interpolated point indicating a position of an interpolated point by longitude and latitude, or the like; reference numeral 320 denotes coordinates on a start point side indicating the position of the start point of a road by longitude and latitude, or the like; and reference numeral 322 denotes coordinates on a terminal point side indicating the position of the terminal point of a road by longitude and latitude, or the like.

Figure 41A:
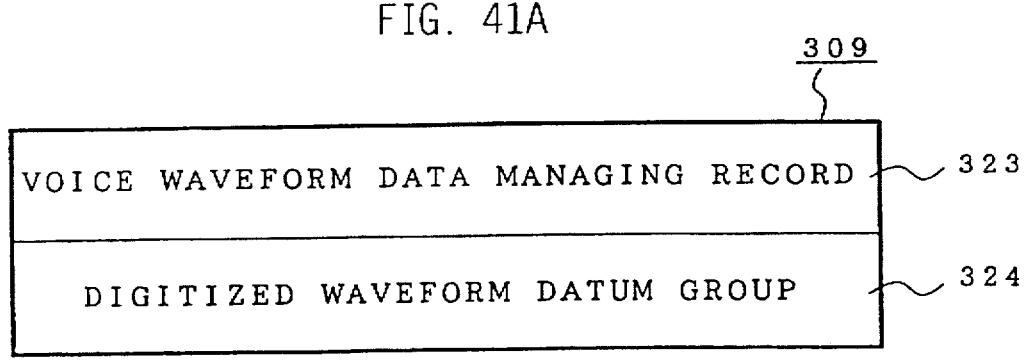
FIG. 41(a), FIG. 41(b) and FIG. 41(c) are charts respectively showing the construction of the voice waveform data, the construction of the voice waveform data managing record and the construction of the digitized waveform data of the in-car navigation apparatus shown in FIG. 38, the latter two of which constitute the voice waveform data.
Figure 41B:
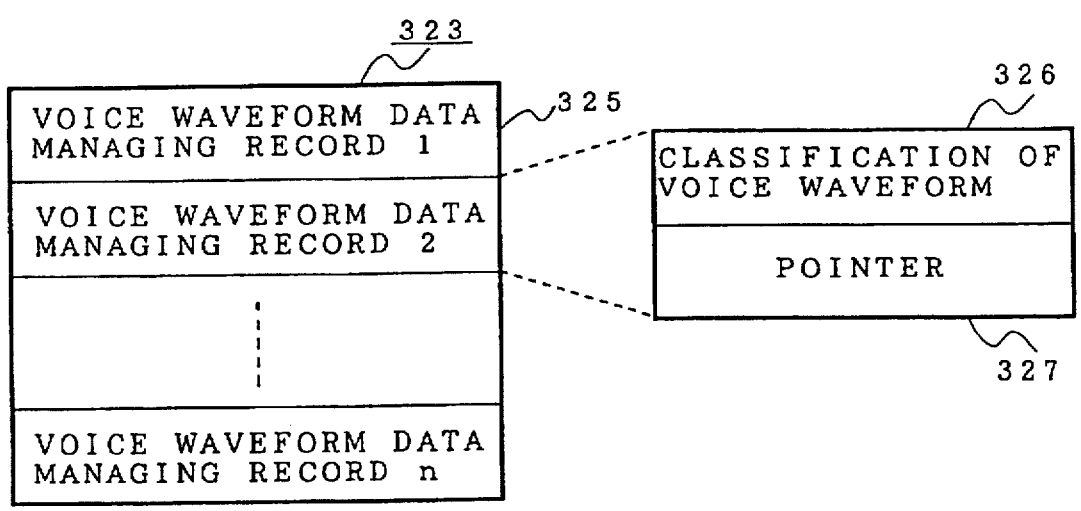
Figure 41C:
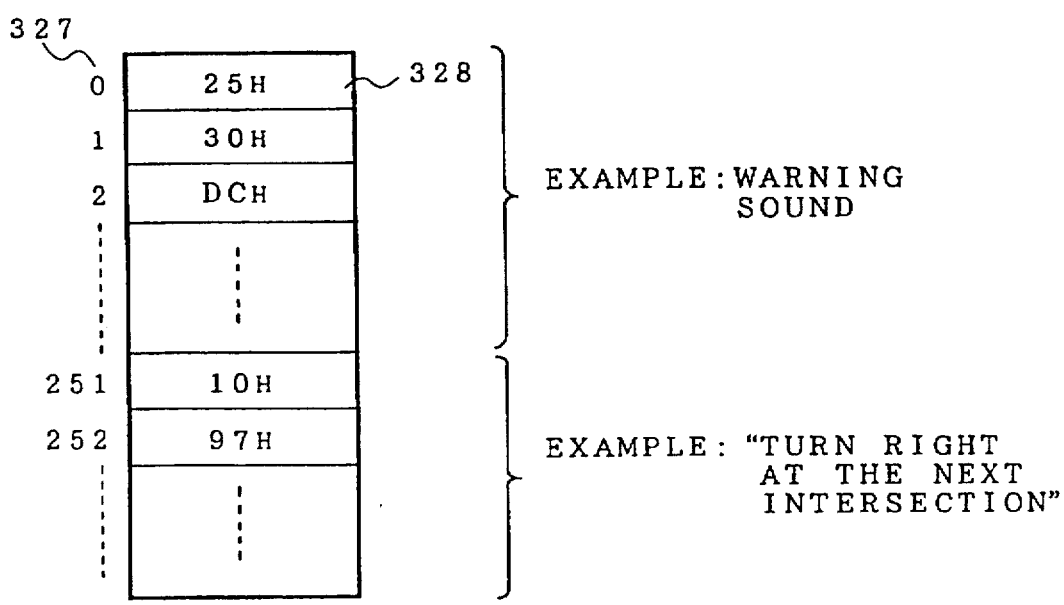

In FIG. 41(a), FIG. 41(b) and FIG. 41(c), reference numeral 323 denotes voice waveform data managing information, one of the composing elements of the voice waveform datum group 309, for storing managing information concerning the contents of voice waveform data; reference numeral 324 denotes a digitized waveform datum group being the other composing element of the voice waveform datum group 309, and being a set of digitized waveform data; reference numeral 325 denotes a voice waveform data managing record for storing the managing information of each unit of voice messages; reference numeral 326 denotes a classification of a voice waveform indicating the classification of a voice message; reference numeral 327 denotes a pointer indicating the position of a corresponding voice waveform datum by the amount of an offset from the front position of the voice waveform datum group 309; and reference numeral 328 denotes the minimum unit of a digitized waveform datum constituting the digitized waveform datum group 324 stored in the map information memorizing section 291 after being converted from an analogue voice waveform to a digitized waveform datum.

FIG. 42 is an advancing direction and classification of a voice waveform correspondence table showing correspondences between advancing directions of a drive route from an intersection being ahead of a present position and classifications of voice waveforms. In the figure, reference numeral 329 denotes advancing directions; and reference numeral 330 denotes corresponding classifications of voice waveforms.

Figure 43:
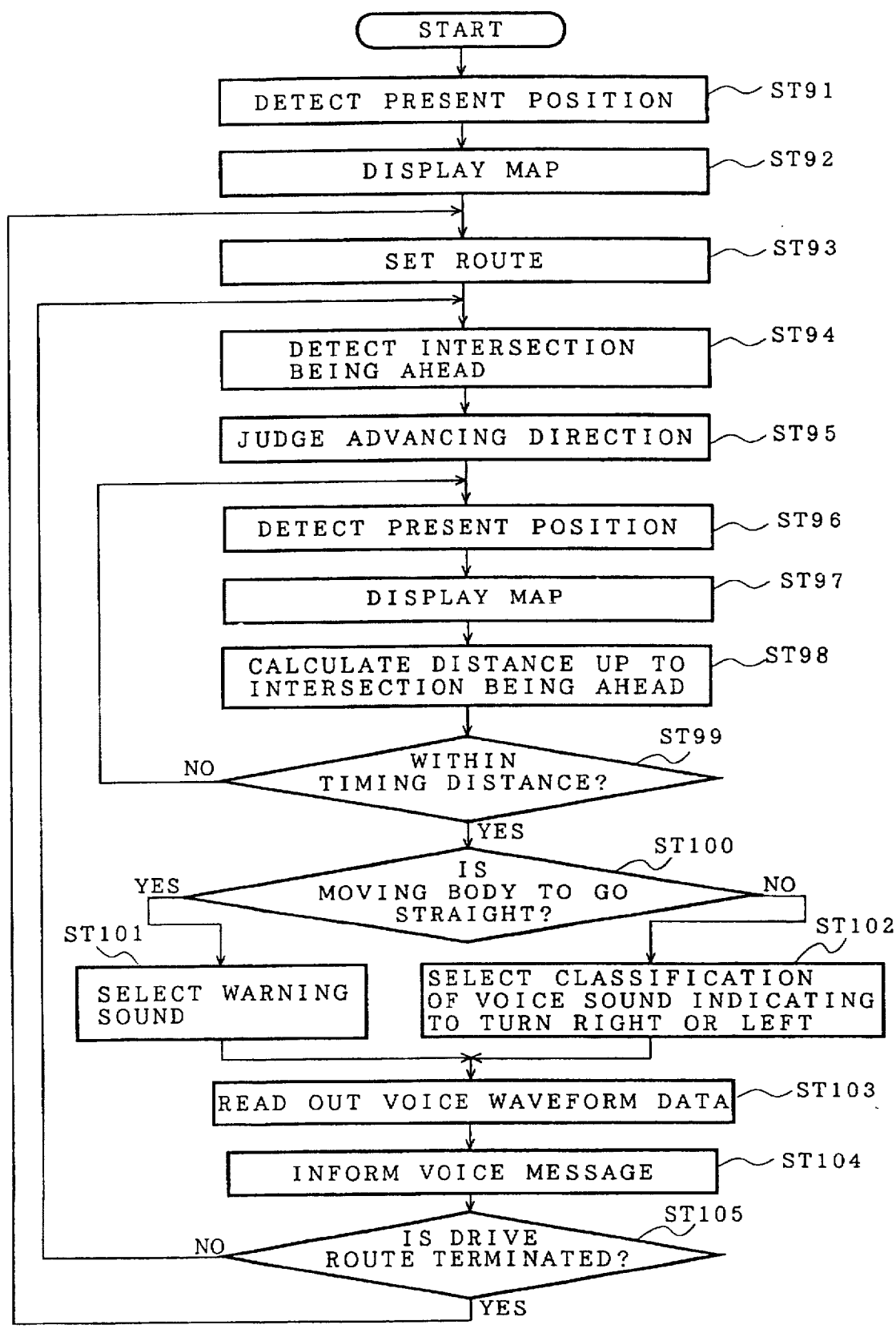
FIG. 43 is a flow chart showing the flow of the process used in the in-car navigation apparatus shown in FIG. 38.
Figure 44:
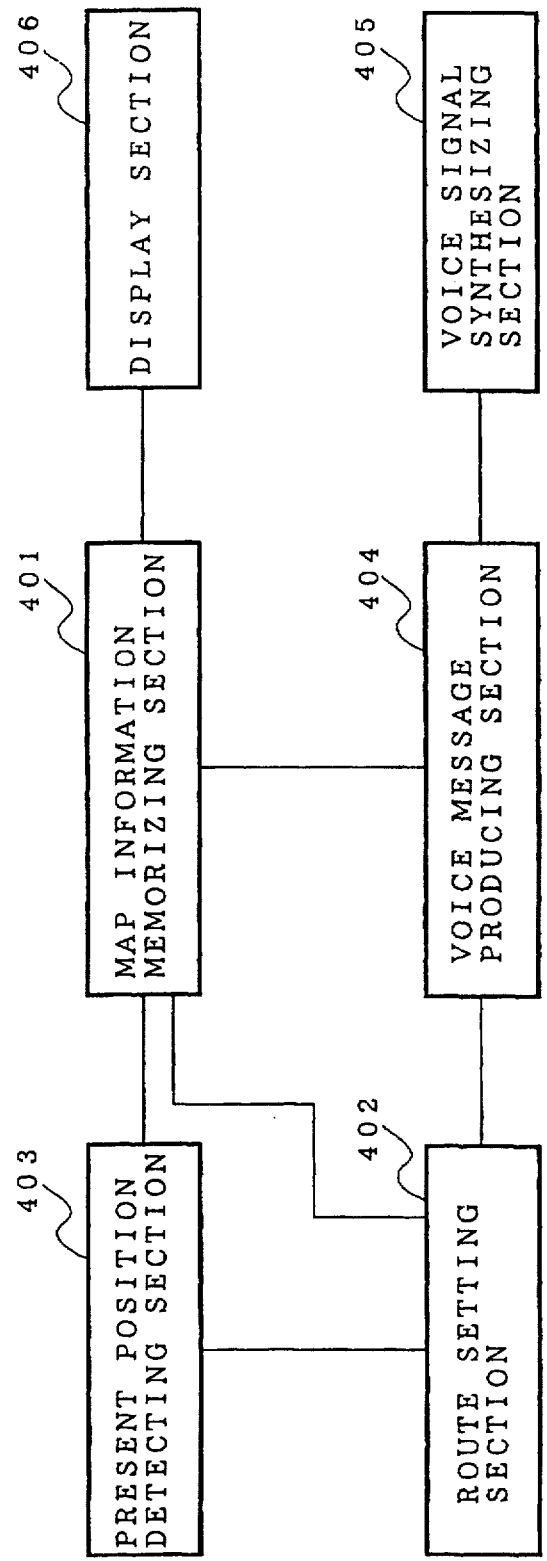
FIG. 44 is a block diagram showing the construction of a conventional in-car navigation apparatus

FIG. 43 is a flow chart showing the flow of the processes used in the in-car navigation apparatus according to the present embodiment. In the figure, reference characters ST91 through ST105 denote units of each process.

In operation, at first, at step ST91, the control section 297 detects the present position of the moving body on the GPS information or the like with the present position detecting section 293. At step ST92, the control section 297 reads out digitized map data 306 belonging to an arbitrary area around the present position from the map information memorizing section 291, and displays a map on the display section 296 in conformity with the intersection coordinates 313 and the coordinates of an interpolated point 321 of the road datum record 311, which coordinates 313 and 321 are respectively shown in FIG. 40(a) and FIG. 40(b). Next, at step ST93, the route setting section 292 sets two points on the map by means of longitude and latitude, or the like, to set a drive route between the two points in conformity with Dijkstra Method, which is a general search algorithm on a network, or the like.

Then, at step ST94, the control section 297 detects an intersection being ahead of the present position. Beside, at step ST95, the control section 297 detects the advancing direction from the intersection in front in the form of going straight, turning right or turning left. This process is executed by calculating the relative angle of the road flowing out of the intersection to the road flowing in the intersection. At step ST96, the control section 297 again detects a new present position by means of the present position detecting section 293 to display a map around the new present position on the display section 296. Next, at step ST98, the control section 297 calculates the distance between the present position detected at step ST96 and the intersection in front to judge whether the distance is within a prescribed distance (e.g. 1 km) set in advance or not, namely whether the moving body is within the timing distance to be informed with a voice message or not, at step ST99. If the result of the judgement shows that the distance is within the prescribed distance, at step ST100, the control section 297 judges whether the moving body is to go straight through the intersection in front or not by examining the advancing direction judged at step ST95. If the judgement concludes to go straight, the control section 297 selects a classification of a voice waveform corresponding to a warning sound.

On the other hand, the result of the judgement at step ST100 is not to go straight, the control section 297 retrieves a classification of a voice waveform 330 corresponding to the advancing direction from the advancing direction and classification of a voice waveform correspondence table shown in Fit. 42 at step ST102. Then, at step ST103, the control section 297 retrieves a corresponding plurality of basic units of digitized waveform data 328 from the voice waveform data managing information 323 of the voice waveform datum group 309 memorized in the map information memorizing section 291 on the basis of the classification of a voice waveform selected at step ST101 or ST102 to read out of the digitized waveform datum group 324. And, at step ST104, the control section 297 informs the messages with voice after converting the read out plurality of digitized waveform data 328 into analogue waveforms. At last, at step ST105, the control section 297 judges whether the drive route has ended or not. If the drive route has not ended yet, the control section 297 returns to step ST94 for repeating the processes of steps after step ST94 with regard to the next intersection. In addition, if the moving body is not within the timing distance where a voice message is to be informed at step ST99, the control section 297 returns to step ST96 to repeat the processes of step ST96 through step ST99 until the moving body comes within the timing distance.

As described above, the in-car navigation apparatus according to the present embodiment is constructed to inform only a warning sound to a driver to an intersection where a moving body is to go straight. Consequently, the driver can confirm the intersection, and can concentrate on driving without hearing the unnecessary information. Therefore, safer driving is enabled.

Although the above described embodiments 2 through embodiment 5 are constructed to memorize voice waveform data and so on in the map information memorizing section, the memory for memorizing those data is not restricted only the map information memorizing section. Those data may be memorized in the voice information memorizing section as the construction of embodiment 1. In that case, similarly in embodiment 1, it goes without saying that guiding a motorist with voices of different sentence patterns or voices translated into the languages of foreign countries can easily be done by changing the contents of the voice messages memorized in the voice information memorizing section without changing the program of the apparatus.

It will be appreciated from the foregoing description that, according to the first aspect of the present invention, the in-car navigation apparatus is constructed to comprise a detachable voice information memorizing means for storing a plurality of voice message pattern codes respectively corresponding to a plurality of voice message concepts to be informed to a motorist of a moving body, and for storing a plurality of voice waveform data respectively corresponding to the plurality of voice message pattern codes, and a control means for determining at least a voice informing point on a drive route set by a route setting means on the basis of the detected present position of the moving body and the digitized map data, and a concept of a voice message to be informed at the point, and for reading out a voice message pattern code corresponding to the concept of a determined voice message from the voice information memorizing means, and for outputting an instruction for reading out a voice waveform datum corresponding to the voice message pattern code to a voice message informing means, and consequently, there can be obtained an effect that it is easily enabled to guide with voice by means of voice messages having different sentence patterns or voice messages translated into foreign languages by changing the contents of voice messages memorized in the voice information memorizing means without changing the program of the apparatus.

Furthermore, according to the second aspect of the present invention, the in-car navigation apparatus is constructed to comprise a point setting means for setting a set point at an arbitrary position on a map, where digitized map data are spread, by means of an input of a motorist of a moving body, and a control means including an instructing means for calculating a distance between the detected present position of the moving body and the set point, and for instructing a voice message informing means to determine the direction of the set point to the advancing direction of the moving body when the calculated distance is within a prescribed distance, and to select a voice message concept in accordance with the direction to read out a corresponding voice waveform datum, and consequently, there can be obtained an effect that the motorist of the moving body can easily find the set point during driving when the moving body approaches to the vicinity of the set point.

Furthermore, according to the third aspect of the present invention, the in-car navigation apparatus is constructed to comprise an intersection to be guided detecting means for detecting an intersection on a drive route to be guided by voice information and an advancing direction from the intersection to be guided by voice information on the basis of digitized map data and a drive route set by a route setting means, and a control means including an instructing means for calculating the distance between the intersection to be guided by voice information and the detected present position of a moving body, and for instructing a voice message informing means to select a voice message concept indicating the distance up to the intersection to be guided by voice information and the advancing direction from the intersection to be guided by voice information if the calculated distance is within a prescribed distance, and to select a voice message concept indicating the effect of following the road where the moving body is driving if the calculated distance exceeds the prescribed distance, and to read out a corresponding voice waveform datum, and consequently, there can be obtained effects that the motorist of the moving body, or the like can concentrate on driving without hearing the information unnecessary for the present, and that safer driving is enabled.

Furthermore, according to the fourth aspect of the present invention, the in-car navigation apparatus comprises a control means including an instructing means for judging whether an intersection being ahead of the detected present position of a moving body is an intersection where a road forks through a service road or not on the basis of digitized map data, a drive route set by a drive route setting means and the present position, and for instructing a voice message informing means to hasten the timing of informing a voice message earlier than that of an ordinary intersection, and to select a voice message concept having the voice information indicating the effect of driving through a service road to read out a corresponding voice waveform datum in case of the intersection where a road forks through a service road, and consequently, there can be obtained an effect that the motorist of a moving body, or the like can prepare to branch off to a service road earlier for enabling safer driving.

Furthermore, according to the fifth aspect of the present invention, the in-car navigation apparatus comprises a control means including an instructing means for instructing a voice message informing means to select a voice message concept indicating the effect of turning right or left if a moving body is to turn right or left at an intersection being ahead of the present position of the moving body on the drive route thereof, and to select a warning sound if the moving body is to go straight on, and to read out a corresponding voice waveform datum, and consequently, there can be obtained effects that the motorist of the moving body, or the like can confirm the intersection, and can concentrate on driving without hearing the unnecessary information so that safer driving is enabled.

Furthermore, according to the sixth aspect of the present invention, the in-car navigation apparatus is constructed to comprise a control means for calculating a distance between the detected present position of a moving body and a set point, and for determining the direction of the set point to the advancing direction of the moving body if the calculated distance is within a prescribed distance to output an instruction to select a voice message in accordance with the determined direction to a voice message informing means, and consequently, there can be obtained an effect that the motorist can easily find the set point during driving when the moving body approaches to the vicinity of the set point.

Furthermore, according to the seventh aspect of the present invention, the in-car navigation apparatus is constructed to comprise an intersection to be guided detecting means for detecting an intersection on a drive route to be guided by voice information and an advancing direction from the intersection to be guided by voice information, and a control means for calculating the distance between the intersection to be guided by voice information and the detected present position of a moving body, and for outputting an instruction to select a voice message indicating the distance up to the intersection to be guided by voice information and an advancing direction from the intersection to be guided by voice information if the calculated distance is within a prescribed distance, and to select a voice message indicating the effect of following a road where the moving body is driving if the calculated distance exceeds the prescribed distance, to a voice message informing means, and consequently, there can be obtained effects that the motorist of a moving body, or the like can concentrate on driving without hearing the information unnecessary for the present, and that safer driving is enabled.

Furthermore, according to the eighth aspect of the present invention, the in-car navigation apparatus is constructed to comprise a control means for judging whether an intersection being ahead of the detected present position of a moving body is an intersection where a road forks through a service road or not on the basis of digitized map data, a drive route set by a drive route setting means and the present position, and for outputting an instruction to hasten the timing of informing a voice message earlier than that of an ordinary intersection, and to select a voice message having voice information indicating the effect of driving through a service road in case of the intersection where a road forks through a service road, to a voice message informing means, and consequently, there can be obtained an effect that the motorist of a moving body, or the like can prepare to branch off to a service road earlier for enabling safer driving.

Furthermore, according to the ninth aspect of the invention, the in-car navigation apparatus is constructed to comprise a control means for outputting an instruction to select a voice message indicating the effect of turning right or left if a moving body is to turn right or left at an intersection being ahead of the present position of the moving body on the drive route thereof, and to select a warning sound if the moving body is to go straight on, to a voice message informing means, and consequently, there can be obtained effects that the motorist of a moving body, or the like can confirm the intersection, and can concentrate on driving without hearing the unnecessary information so that safer driving is enabled.

While preferred embodiments of the present invention have been described using specific terms, such description is for illustrative purposes only, and it is to be understood that changes and variations may be made without departing from the spirit or scope of the following claims.

What is claimed is:

1. An in-car navigation apparatus installed in a moving body for presenting information for guiding said moving body along a set drive route to a motorist of the moving body, said apparatus comprising:

a map information memorizing means for storing digitized map data including at least road data and intersection data;

a route setting means for setting a drive route, where said moving body moves, between two points on said digitized map data;

a present position detecting means for detecting a present position of said moving body on said digitized map data;

a detachable voice information memorizing means for storing a plurality of voice message pattern codes respectively corresponding to a plurality of voice message concepts to be informed to said motorist of the moving body, and for storing a plurality of voice waveform data respectively corresponding to said plurality of voice message pattern codes;

a control means for determining at least a voice informing point on said drive route set by said route setting means on the basis of the detected present position of said moving body and said digitized map data, and a concept of a voice message to be informed at the point, and for reading out a voice message pattern code corresponding to a concept of a determined voice message from said voice information memorizing means, and for outputting an instruction for reading out a voice wave form datum corresponding to said voice message pattern code; and a voice message informing means for reading out said voice waveform datum memorized in said voice information memorizing means in response to the instruction from said control means to execute digital to analogue conversion, and then for outputting a voice message based on the voice waveform datum.

2. An in-car navigation apparatus according to claim 1, wherein said control means comprises an instructing means for judging whether an intersection being ahead of a detected present position of said moving body is an intersection where a road forks through a service road or not on the basis of said digitized map data, said drive route set by said drive route setting means and said present position, and for instructing said voice message informing means to hasten timing of informing a voice message earlier than that of an ordinary intersection, and to select a voice message concept having voice information indicating an effect of driving through said service road to read out a corresponding voice waveform datum in case of the intersection where a road forks through a service road.

3. An in-car navigation apparatus according to claim 1, wherein said control means comprises an instructing means for instructing said voice message informing means to select a voice message concept indicating an effect of turning right or left if said moving body is to turn right or left at an intersection being ahead of a present position of said moving body on said drive route, and to select a warning sound if said moving body is to go straight on, and to read out a corresponding voice waveform datum.

4. An in-car navigation apparatus according to claim 1 further comprising a point setting means for setting a set point at an arbitrary position on a map, where said digitized map data are spread, by means of an input of the motorist of said moving body, wherein said control means comprises an instructing means for calculating a distance between a detected present position of said moving body and said set point, and for instructing said voice message informing means to determine a direction of said set point to an advancing position of said moving body when said calculated distance is within a prescribed distance, and to select a voice message concept in accordance with the direction to read out a corresponding voice waveform datum.

5. An in-car navigation apparatus according to claim 4, wherein said control means comprises an instructing means for judging whether an intersection being ahead of a detected present position of said moving body is an intersection where a road forks through a service road or not on the basis of said digitized map data, said drive route set by said drive route setting means and said present position, and for instructing said voice message informing means to hasten timing of informing a voice message earlier than that of an ordinary intersection, and to select a voice message concept having voice information indicating an effect of driving through said service road to read out a corresponding voice waveform datum in case of the intersection where a road forks through a service road.

6. An in-car navigation apparatus according to claim 4, wherein said control means comprises an instructing means for instructing said voice message informing means to select a voice message concept indicating an effect of turning right or left if said moving body is to turn right or left at an intersection being ahead of a present position of said moving body on said drive route, and to select a warning sound if said moving body is to go straight on, and to read out a corresponding voice waveform datum.

7. An in-car navigation apparatus according to claim 1 further comprising an intersection to be guided detecting means for detecting an intersection on said drive route to be guided by voice information and an advancing direction from said intersection to be guided by voice information, wherein said control means comprises an instructing means for calculating a distance between said intersection to be guided by voice information and a detected present position of said moving body, and for instructing said voice message informing means to select a voice message concept indicating a distance up to said intersection to be guided by voice information and an advancing direction from said intersection to be guided by voice information if a calculated distance is within a prescribed distance, and to select a voice message concept indicating an effect of following a road where said moving body is driving if the calculated distance exceeds said prescribed distance, and to read out a corresponding voice waveform datum.

8. An in-car navigation apparatus according to claim 7, wherein said control means comprises an instructing means for judging whether an intersection being ahead of a detected present position of said moving body is an intersection where a road forks through a service road or not on the basis of said digitized map data, said drive route set by said drive route setting means and said present position, and for instructing said voice message informing means to hasten timing of informing a voice message earlier than that of an ordinary intersection, and to select a voice message concept having voice information indicating an effect of driving through said service road to read out a corresponding voice waveform datum in case of the intersection where a road forks through a service road.

9. An in-car navigation apparatus according to claim 7, wherein said control means comprises an instructing means for instructing said voice message informing means to select a voice message concept indicating an effect of turning right or left if said moving body is to turn right or left at an intersection being ahead of a present position of said moving body on said drive route, and to select a warning sound if said moving body is to go straight on, and to read out a corresponding voice waveform datum.

10. An in-car navigation apparatus installed in a moving body for presenting information for guiding said moving body along a set drive route to a motorist of the moving body, said apparatus comprising:

a map information memorizing means for storing digitized map data including at least road data, intersection data and voice waveform data;

a route setting means for setting a set point at an arbitrary position on a map, where said digitized map data are spread, by means of an input of the motorist of said moving body;

a present position detecting means for detecting a present position of said moving body on said digitized map data;

a control means for calculating a distance between a detected present position of said moving body and said set point and for determining a direction of said set point to an advancing position of said moving body if a calculated distance is within a prescribed distance to output an instruction to select a voice message in accordance with the determined direction; and a voice message informing means for selecting a voice message among a plurality of voice messages in response to the instruction from said control means, and for reading out a corresponding voice waveform datum from said map information memorizing means to execute digital to analogue conversion, and then for outputting a voice message based on the voice waveform datum.

11. An in-car navigation apparatus installed in a moving body for presenting information for guiding said moving body along a set drive route to a motorist of the moving body, said apparatus comprising:

a map information memorizing means for storing digitized map data including at least road data, intersection data and voice waveform data;

a present position detecting means for detecting a present position of said moving body on said digitized map data;

a route setting means for setting a drive route, where said moving body moves, between two points on said digitized map data;

a control means for judging whether an intersection being ahead of a detected present position of said moving body is an intersection where a road forks through a service road or not on the basis of said digitized map data, said drive route set by said drive route setting means and said present position, and for outputting an instruction to hasten timing of informing a voice message earlier than that of an ordinary intersection, and to select a voice message having voice information indicating an effect of driving through said service road in case of the intersection where a road forks through a service road; and a voice message informing means for selecting a voice message among a plurality of voice messages in response to the instruction from said control means, and for reading out a corresponding voice waveform datum from said map information memorizing means to execute digital to analogue conversion, and then for outputting a message based on the voice waveform datum.

* * * * *